United States Patent
Paek et al.

(10) Patent No.: US 9,596,643 B2
(45) Date of Patent: Mar. 14, 2017

(54) PROVIDING A USER INTERFACE EXPERIENCE BASED ON INFERRED VEHICLE STATE

(71) Applicant: Microsoft Corporation, Redmond, WA (US)

(72) Inventors: Timothy S. Paek, Sammamish, WA (US); Paramvir Bahl, Bellevue, WA (US); Sreenivas Addagatla, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/332,235

(22) Filed: Jul. 15, 2014

(65) Prior Publication Data
US 2014/0329487 A1    Nov. 6, 2014

Related U.S. Application Data

(63) Continuation of application No. 13/327,786, filed on Dec. 16, 2011, now Pat. No. 8,811,938.

(51) Int. Cl.
*H04M 11/04*  (2006.01)
*H04W 48/04*  (2009.01)
(Continued)

(52) U.S. Cl.
CPC ............. *H04W 48/04* (2013.01); *B60K 35/00* (2013.01); *B60K 37/06* (2013.01); *G06F 1/1632* (2013.01);
(Continued)

(58) Field of Classification Search
CPC ........ H04W 48/04; H04W 4/027; H04W 4/22
(Continued)

(56) References Cited

U.S. PATENT DOCUMENTS 4,627,620 A    12/1986 Yang
4,630,910 A    12/1986 Ross
(Continued)

FOREIGN PATENT DOCUMENTS

CN    101141136 A    3/2008
CN    101254344      3/2008
(Continued)

OTHER PUBLICATIONS

Zhu et al., "Controlled Human Pose Estimation From Depth Image Streams," Proceedings of the IEEE Computer Society Conference on Computer Vision and Pattern Recognition, Jun. 23, 2008.
(Continued)

*Primary Examiner* — Nathan Taylor
(74) *Attorney, Agent, or Firm* — Alin Corie; Sandy Swain; Micky Minhas

(57) ABSTRACT

A mobile device is described herein that provides a user interface experience to a user who is operating the mobile device within a vehicle. The mobile device provides the user interface experience using mode functionality. The mode functionality operates by receiving inference-input information from one or more input sources. At least one input source corresponds to at least one movement-sensing device, provided by the mobile device, that determines movement of the mobile device. The mode functionality then infers a state of the vehicle based on the inference-input information and presents a user interface experience that is appropriate for the vehicle state. In one scenario, the mode functionality can also infer that the vehicle is in a distress condition. In response, the mode functionality can solicit assistance for the user.

20 Claims, 17 Drawing Sheets

(51) Int. Cl.

| | | |
|---|---|---|
| *G06F 1/16* | (2006.01) | |
| *G06F 3/0481* | (2013.01) | |
| *B60K 35/00* | (2006.01) | |
| *B60K 37/06* | (2006.01) | |
| *H04W 4/02* | (2009.01) | |
| *H04W 4/22* | (2009.01) | |

(52) U.S. Cl.
CPC .......... *G06F 1/1694* (2013.01); *G06F 3/0481* (2013.01); *H04W 4/027* (2013.01); *H04W 4/22* (2013.01); *B60K 2350/1028* (2013.01); *B60K 2350/1044* (2013.01); *B60K 2350/1052* (2013.01); *B60K 2350/2013* (2013.01)

(58) Field of Classification Search
USPC .......... 455/41.2, 404.1–404.2, 418; 340/441, 340/575–576
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair |
| 4,702,475 A | 10/1987 | Elstein |
| 4,711,543 A | 12/1987 | Blair |
| 4,731,860 A | 3/1988 | Wahl |
| 4,751,642 A | 6/1988 | Silva |
| 4,751,643 A | 6/1988 | Lorensen |
| 4,796,997 A | 1/1989 | Svetkoff |
| 4,809,065 A | 2/1989 | Harris |
| 4,817,950 A | 4/1989 | Goo |
| 4,843,568 A | 6/1989 | Krueger |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson |
| 5,109,537 A | 4/1992 | Toki |
| 5,139,261 A | 8/1992 | Openiano |
| 5,148,154 A | 9/1992 | MacKay |
| 5,156,243 A | 10/1992 | Aoki et al. |
| 5,184,295 A | 2/1993 | Mann |
| 5,229,754 A | 7/1993 | Aoki |
| 5,229,756 A | 7/1993 | Kosugi |
| 5,239,463 A | 8/1993 | Blair |
| 5,239,464 A | 8/1993 | Blair |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu |
| 5,405,152 A | 4/1995 | Katanics |
| 5,414,643 A | 5/1995 | Blackman et al. |
| 5,417,210 A | 5/1995 | Funda |
| 5,423,554 A | 6/1995 | Davis |
| 5,454,043 A | 9/1995 | Freeman |
| 5,469,740 A | 11/1995 | French |
| 5,495,576 A | 2/1996 | Ritchey |
| 5,516,105 A | 5/1996 | Eisenbrey |
| 5,524,637 A | 6/1996 | Erickson |
| 5,525,901 A | 6/1996 | Clymer et al. |
| 5,528,263 A | 6/1996 | Platzker et al. |
| 5,534,917 A | 7/1996 | MacDougall |
| 5,563,988 A | 10/1996 | Maes |
| 5,577,981 A | 11/1996 | Jarvik |
| 5,580,249 A | 12/1996 | Jacobsen |
| 5,594,469 A | 1/1997 | Freeman |
| 5,597,309 A | 1/1997 | Riess |
| 5,611,731 A | 3/1997 | Bouton et al. |
| 5,615,132 A | 3/1997 | Horton et al. |
| 5,616,078 A | 4/1997 | Oh |
| 5,617,312 A | 4/1997 | Iura |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich |
| 5,703,367 A | 12/1997 | Hashimoto |
| 5,704,837 A | 1/1998 | Iwasaki |
| 5,715,834 A | 2/1998 | Bergamasco |
| 5,732,227 A | 3/1998 | Kuzunuki et al. |
| 5,757,360 A | 5/1998 | Nitta et al. |
| 5,801,704 A | 9/1998 | Oohara et al. |
| 5,828,779 A | 10/1998 | Maggioni |
| 5,864,808 A | 1/1999 | Ando et al. |
| 5,875,108 A | 2/1999 | Hoffberg |
| 5,877,803 A | 3/1999 | Wee |
| 5,909,189 A | 6/1999 | Blackman et al. |
| 5,913,727 A | 6/1999 | Ahdoot |
| 5,933,125 A | 8/1999 | Fernie |
| 5,959,574 A | 9/1999 | Poore, Jr. |
| 5,971,583 A | 10/1999 | Ohnishi |
| 5,980,256 A | 11/1999 | Carmein |
| 5,989,157 A | 11/1999 | Walton |
| 5,995,649 A | 11/1999 | Marugame |
| 6,002,808 A | 12/1999 | Freeman |
| 6,005,548 A | 12/1999 | Latypov |
| 6,009,210 A | 12/1999 | Kang |
| 6,016,487 A | 1/2000 | Rioux |
| 6,054,991 A | 4/2000 | Crane |
| 6,066,075 A | 5/2000 | Poulton |
| 6,067,077 A | 5/2000 | Martin et al. |
| 6,072,467 A | 6/2000 | Walker |
| 6,072,494 A | 6/2000 | Nguyen |
| 6,073,489 A | 6/2000 | French |
| 6,077,201 A | 6/2000 | Cheng |
| 6,098,458 A | 8/2000 | French |
| 6,100,896 A | 8/2000 | Strohecker |
| 6,101,289 A | 8/2000 | Kellner |
| 6,111,580 A | 8/2000 | Kazama et al. |
| 6,128,003 A | 10/2000 | Smith |
| 6,130,677 A | 10/2000 | Kunz |
| 6,141,463 A | 10/2000 | Covell |
| 6,147,678 A | 11/2000 | Kumar et al. |
| 6,151,009 A | 11/2000 | Kanade |
| 6,152,856 A | 11/2000 | Studor |
| 6,159,100 A | 12/2000 | Smith |
| 6,173,066 B1 | 1/2001 | Peurach |
| 6,173,070 B1 | 1/2001 | Michael |
| 6,181,343 B1 | 1/2001 | Lyons |
| 6,188,777 B1 | 2/2001 | Darrell |
| 6,191,773 B1 | 2/2001 | Maruno et al. |
| 6,195,104 B1 | 2/2001 | Lyons |
| 6,205,231 B1 | 3/2001 | Isadore-Barreca |
| 6,215,890 B1 | 4/2001 | Matsuo et al. |
| 6,215,898 B1 | 4/2001 | Woodfill |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar |
| 6,256,033 B1 | 7/2001 | Nguyen |
| 6,256,400 B1 | 7/2001 | Takata |
| 6,269,172 B1 | 7/2001 | Regh et al. |
| 6,283,860 B1 | 9/2001 | Lyons |
| 6,289,112 B1 | 9/2001 | Jain |
| 6,299,308 B1 | 10/2001 | Voronka |
| 6,301,370 B1 | 10/2001 | Steffens et al. |
| 6,308,565 B1 | 10/2001 | French |
| 6,311,159 B1 | 10/2001 | Van Tichelen et al. |
| 6,316,934 B1 | 11/2001 | Amorai-Moriya |
| 6,347,998 B1 | 2/2002 | Yoshitomi et al. |
| 6,353,679 B1 | 3/2002 | Cham |
| 6,363,160 B1 | 3/2002 | Bradski |
| 6,375,572 B1 | 4/2002 | Masuyama et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French |
| 6,476,834 B1 | 11/2002 | Doval |
| 6,496,598 B1 | 12/2002 | Harman |
| 6,503,195 B1 | 1/2003 | Keller |
| 6,509,889 B2 | 1/2003 | Kamper et al. |
| 6,539,107 B1 | 3/2003 | Michael |

(56) References Cited

U.S. PATENT DOCUMENTS

| | | |
|---|---|---|
| 6,539,931 B2 | 4/2003 | Trajkovic |
| 6,542,621 B1 | 4/2003 | Brill et al. |
| 6,545,661 B1 | 4/2003 | Goschy et al. |
| 6,570,555 B1 | 5/2003 | Prevost |
| 6,591,236 B2 | 7/2003 | Lewis et al. |
| 6,594,616 B2 | 7/2003 | Zhang et al. |
| 6,600,475 B2 | 7/2003 | Gutta et al. |
| 6,603,488 B2 | 8/2003 | Humpleman et al. |
| 6,633,294 B1 | 10/2003 | Rosenthal |
| 6,640,202 B1 | 10/2003 | Dietz |
| 6,642,955 B1 | 11/2003 | Midgley |
| 6,661,918 B1 | 12/2003 | Gordon |
| 6,674,877 B1 | 1/2004 | Jojic |
| 6,681,031 B2 | 1/2004 | Cohen |
| 6,714,665 B1 | 3/2004 | Hanna |
| 6,720,949 B1 | 4/2004 | Pryor et al. |
| 6,731,799 B1 | 5/2004 | Sun |
| 6,738,066 B1 | 5/2004 | Nguyen |
| 6,744,420 B2 | 6/2004 | Mohri |
| 6,750,848 B1 | 6/2004 | Pryor |
| 6,753,879 B1 | 6/2004 | Deleeuw |
| 6,757,571 B1 | 6/2004 | Toyama |
| 6,765,726 B2 | 7/2004 | French |
| 6,771,818 B1 | 8/2004 | Krumm |
| 6,788,809 B1 | 9/2004 | Grzeszczuk |
| 6,795,567 B1 | 9/2004 | Cham et al. |
| 6,801,637 B2 | 10/2004 | Voronka |
| 6,804,396 B2 | 10/2004 | Higaki et al. |
| 6,868,383 B1 | 3/2005 | Bangalore et al. |
| 6,873,723 B1 | 3/2005 | Aucsmith |
| 6,876,496 B2 | 4/2005 | French |
| 6,888,960 B2 | 5/2005 | Penev et al. |
| 6,928,344 B2 | 8/2005 | McWalter |
| 6,937,742 B2 | 8/2005 | Roberts |
| 6,940,538 B2 | 9/2005 | Rafey |
| 6,950,534 B2 | 9/2005 | Cohen |
| 6,980,312 B1 | 12/2005 | Czyszczewski et al. |
| 6,982,697 B2 | 1/2006 | Wilson et al. |
| 6,990,639 B2 | 1/2006 | Wilson |
| 6,999,084 B2 | 2/2006 | Mochizuki |
| 7,003,134 B1 | 2/2006 | Covell |
| 7,007,236 B2 | 2/2006 | Dempski et al. |
| 7,036,094 B1 | 4/2006 | Cohen et al. |
| 7,038,661 B2 | 5/2006 | Wilson |
| 7,038,855 B2 | 5/2006 | French |
| 7,039,676 B1 | 5/2006 | Day |
| 7,042,440 B2 | 5/2006 | Pryor |
| 7,050,606 B2 | 5/2006 | Paul |
| 7,058,204 B2 | 6/2006 | Hildreth |
| 7,060,957 B2 | 6/2006 | Lange |
| 7,068,842 B2 | 6/2006 | Liang |
| 7,070,500 B1 | 7/2006 | Nomi et al. |
| 7,094,147 B2 | 8/2006 | Nakata et al. |
| 7,095,401 B2 | 8/2006 | Liu et al. |
| 7,113,918 B1 | 9/2006 | Ahmad |
| 7,121,946 B2 | 10/2006 | Paul |
| 7,148,913 B2 | 12/2006 | Keaton et al. |
| 7,170,492 B2 | 1/2007 | Bell |
| 7,184,048 B2 | 2/2007 | Hunter |
| 7,202,898 B1 | 4/2007 | Braun |
| 7,206,435 B2 | 4/2007 | Fujimura et al. |
| 7,222,078 B2 | 5/2007 | Abelow |
| 7,225,414 B1 | 5/2007 | Sharma et al. |
| 7,227,526 B2 | 6/2007 | Hildreth |
| 7,227,893 B1 | 6/2007 | Srinivasa |
| 7,250,936 B2 | 7/2007 | Wilson et al. |
| 7,259,747 B2 | 8/2007 | Bell |
| 7,274,800 B2 | 9/2007 | Nefian et al. |
| 7,307,617 B2 | 12/2007 | Wilson et al. |
| 7,308,112 B2 | 12/2007 | Fujimura |
| 7,317,836 B2 | 1/2008 | Fujimura |
| 7,321,854 B2 | 1/2008 | Sharma et al. |
| 7,324,671 B2 | 1/2008 | Li |
| 7,340,077 B2 | 3/2008 | Gokturk et al. |
| 7,348,963 B2 | 3/2008 | Bell |
| 7,359,121 B2 | 4/2008 | French |
| 7,367,887 B2 | 5/2008 | Watabe |
| 7,372,977 B2 | 5/2008 | Fujimura |
| 7,379,563 B2 | 5/2008 | Shamaie |
| 7,379,566 B2 | 5/2008 | Hildreth |
| 7,389,591 B2 | 6/2008 | Jaiswal |
| 7,394,346 B2 | 7/2008 | Bodin |
| 7,412,077 B2 | 8/2008 | Li |
| 7,421,093 B2 | 9/2008 | Hildreth |
| 7,430,312 B2 | 9/2008 | Gu |
| 7,436,496 B2 | 10/2008 | Kawahito |
| 7,450,736 B2 | 11/2008 | Yang |
| 7,452,275 B2 | 11/2008 | Kuraishi |
| 7,460,690 B2 | 12/2008 | Cohen |
| 7,489,812 B2 | 2/2009 | Fox |
| 7,492,367 B2 | 2/2009 | Mahajan et al. |
| 7,519,223 B2 | 4/2009 | Dehlin et al. |
| 7,526,101 B2 | 4/2009 | Avidan |
| 7,536,032 B2 | 5/2009 | Bell |
| 7,552,403 B2 | 6/2009 | Wilson |
| 7,555,142 B2 | 6/2009 | Hildreth |
| 7,560,701 B2 | 7/2009 | Oggier |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura |
| 7,593,552 B2 | 9/2009 | Higaki |
| 7,593,593 B2 | 9/2009 | Wilson |
| 7,596,767 B2 | 9/2009 | Wilson |
| 7,598,942 B2 | 10/2009 | Underkoffler |
| 7,607,509 B2 | 10/2009 | Schmiz |
| 7,613,358 B2 | 11/2009 | Wilson |
| 7,620,202 B2 | 11/2009 | Fujimura |
| 7,639,148 B2 | 12/2009 | Victor |
| 7,665,041 B2 | 2/2010 | Wilson |
| 7,668,340 B2 | 2/2010 | Cohen |
| 7,680,298 B2 | 3/2010 | Roberts |
| 7,683,883 B2 | 3/2010 | Touma et al. |
| 7,683,954 B2 | 3/2010 | Ichikawa |
| 7,684,592 B2 | 3/2010 | Paul |
| 7,701,439 B2 | 4/2010 | Hillis |
| 7,702,130 B2 | 4/2010 | Im |
| 7,704,135 B2 | 4/2010 | Harrison, Jr. |
| 7,710,391 B2 | 5/2010 | Bell |
| 7,721,231 B2 | 5/2010 | Wilson |
| 7,725,129 B2 | 5/2010 | Grunhold |
| 7,729,530 B2 | 6/2010 | Antonov |
| 7,746,345 B2 | 6/2010 | Hunter |
| 7,760,182 B2 | 7/2010 | Ahmad |
| 7,809,167 B2 | 10/2010 | Bell |
| 7,823,089 B2 | 10/2010 | Wilson |
| 7,834,846 B1 | 11/2010 | Bell |
| 7,852,262 B2 | 12/2010 | Namineni |
| 7,890,199 B2 | 2/2011 | Inagaki |
| RE42,256 E | 3/2011 | Edwards |
| 7,898,522 B2 | 3/2011 | Hildreth |
| 7,907,117 B2 | 3/2011 | Wilson |
| 7,927,216 B2 | 4/2011 | Ikeda et al. |
| 7,974,443 B2 | 7/2011 | Kipman |
| 7,988,558 B2 | 8/2011 | Sato |
| 8,009,871 B2 | 8/2011 | Rafii |
| 8,035,612 B2 | 10/2011 | Bell |
| 8,035,614 B2 | 10/2011 | Bell |
| 8,035,624 B2 | 10/2011 | Bell |
| 8,049,719 B2 | 11/2011 | Wilson |
| 8,072,470 B2 | 12/2011 | Marks |
| 8,115,732 B2 | 2/2012 | Wilson |
| 8,132,126 B2 | 3/2012 | Wilson |
| 8,165,422 B2 | 4/2012 | Wilson |
| 8,175,374 B2 | 5/2012 | Pinault |
| 8,187,096 B2 | 5/2012 | Ohta et al. |
| 8,213,962 B2 | 7/2012 | Carr |
| 8,246,458 B2 | 8/2012 | Nakajima et al. |
| 8,246,460 B2 | 8/2012 | Kitahara |
| 8,249,334 B2 | 8/2012 | Berliner |
| 8,251,820 B2 | 8/2012 | Marks et al. |
| 8,282,487 B2 | 10/2012 | Wilson et al. |
| 8,287,373 B2 | 10/2012 | Marks et al. |
| 8,295,546 B2 | 10/2012 | Craig |

(56) References Cited

U.S. PATENT DOCUMENTS

| | | | |
|---|---|---|---|
| 8,303,411 B2 | 11/2012 | Marks et al. | |
| 8,308,563 B2 | 11/2012 | Ikeda et al. | |
| 8,308,564 B2 | 11/2012 | Yoshida et al. | |
| 8,428,340 B2 | 4/2013 | Marais | |
| 8,456,419 B2 | 6/2013 | Wilson | |
| 8,552,976 B2 | 10/2013 | Wilson | |
| 8,553,094 B2 | 10/2013 | Lin | |
| 8,560,972 B2 | 10/2013 | Wilson | |
| 8,599,173 B2 | 12/2013 | Soo et al. | |
| 8,612,884 B2 | 12/2013 | Capela et al. | |
| 8,670,632 B2 | 3/2014 | Wilson | |
| 8,707,216 B2 | 4/2014 | Wilson | |
| 8,745,541 B2 | 6/2014 | Wilson et al. | |
| 8,747,224 B2 | 6/2014 | Miyazaki et al. | |
| 8,814,688 B2 | 8/2014 | Barney et al. | |
| 8,834,271 B2 | 9/2014 | Ikeda | |
| 8,858,336 B2 | 10/2014 | Sawano et al. | |
| 9,171,454 B2 | 10/2015 | Wilson et al. | |
| 2001/0013890 A1 | 8/2001 | Narayanaswami | |
| 2002/0004422 A1 | 1/2002 | Tosaki et al. | |
| 2002/0019258 A1 | 2/2002 | Kim et al. | |
| 2002/0041327 A1 | 4/2002 | Hildreth et al. | |
| 2002/0055383 A1 | 5/2002 | Onda et al. | |
| 2002/0072418 A1 | 6/2002 | Masuyama et al. | |
| 2003/0040350 A1 | 2/2003 | Nakata et al. | |
| 2003/0043270 A1 | 3/2003 | Rafey | |
| 2003/0095140 A1 | 5/2003 | Keaton et al. | |
| 2003/0156756 A1 | 8/2003 | Gokturk et al. | |
| 2003/0216176 A1 | 11/2003 | Shimizu et al. | |
| 2003/0216179 A1 | 11/2003 | Suzuki et al. | |
| 2004/0001113 A1 | 1/2004 | Zipperer et al. | |
| 2004/0005083 A1 | 1/2004 | Fujimura et al. | |
| 2004/0056907 A1 | 3/2004 | Sharma et al. | |
| 2004/0113933 A1 | 6/2004 | Guler | |
| 2004/0155902 A1 | 8/2004 | Dempski et al. | |
| 2004/0155962 A1 | 8/2004 | Marks | |
| 2004/0194129 A1 | 9/2004 | Carlbom et al. | |
| 2004/0204240 A1 | 10/2004 | Barney | |
| 2004/0239670 A1 | 12/2004 | Marks | |
| 2004/0252027 A1* | 12/2004 | Torkkola et al. | 340/576 |
| 2005/0030184 A1* | 2/2005 | Victor | 340/576 |
| 2005/0037730 A1* | 2/2005 | Montague | 455/404.2 |
| 2005/0076161 A1 | 4/2005 | Albanna et al. | |
| 2005/0085298 A1 | 4/2005 | Woolston | |
| 2005/0151850 A1 | 7/2005 | Ahn et al. | |
| 2005/0212753 A1 | 9/2005 | Marvit et al. | |
| 2005/0238201 A1 | 10/2005 | Shamaie | |
| 2005/0239548 A1 | 10/2005 | Ueshima et al. | |
| 2005/0255434 A1 | 11/2005 | Lok et al. | |
| 2005/0266893 A1* | 12/2005 | Lejman et al. | 455/569.1 |
| 2006/0007142 A1 | 1/2006 | Wilson | |
| 2006/0033713 A1 | 2/2006 | Pryor | |
| 2006/0036944 A1 | 2/2006 | Wilson | |
| 2006/0092267 A1 | 5/2006 | Dempski et al. | |
| 2006/0098873 A1 | 5/2006 | Hildreth et al. | |
| 2006/0109245 A1 | 5/2006 | Wilson | |
| 2006/0178212 A1 | 8/2006 | Penzias | |
| 2006/0205394 A1 | 9/2006 | Vesterinen | |
| 2006/0239558 A1 | 10/2006 | Rafii | |
| 2006/0250226 A1* | 11/2006 | Vogel et al. | 340/441 |
| 2006/0252541 A1 | 11/2006 | Zalewski | |
| 2006/0274947 A1 | 12/2006 | Fujimura | |
| 2006/0274957 A1 | 12/2006 | Suzuki | |
| 2007/0060383 A1 | 3/2007 | Dohta | |
| 2007/0066393 A1 | 3/2007 | Paul | |
| 2007/0143333 A1 | 6/2007 | Laird-McConnell | |
| 2007/0192038 A1 | 8/2007 | Kameyama | |
| 2007/0195997 A1 | 8/2007 | Paul | |
| 2007/0243931 A1 | 10/2007 | Ohta et al. | |
| 2007/0252898 A1 | 11/2007 | Delean | |
| 2007/0254738 A1 | 11/2007 | Sato | |
| 2008/0026838 A1 | 1/2008 | Dunstan | |
| 2008/0036732 A1 | 2/2008 | Wilson et al. | |
| 2008/0037829 A1 | 2/2008 | Givon | |
| 2008/0094351 A1 | 4/2008 | Nogami et al. | |
| 2008/0108329 A1* | 5/2008 | Cho et al. | 455/413 |
| 2008/0122786 A1 | 5/2008 | Pryor et al. | |
| 2008/0152191 A1 | 6/2008 | Fujimura | |
| 2008/0181499 A1 | 7/2008 | Yang | |
| 2008/0193043 A1 | 8/2008 | Wilson | |
| 2008/0204410 A1 | 8/2008 | Wilson | |
| 2008/0204411 A1 | 8/2008 | Wilson | |
| 2008/0259055 A1 | 10/2008 | Wilson | |
| 2009/0121894 A1 | 5/2009 | Wilson et al. | |
| 2009/0141933 A1 | 6/2009 | Wagg | |
| 2009/0172606 A1 | 7/2009 | Dunn et al. | |
| 2009/0207136 A1 | 8/2009 | Farag | |
| 2009/0215534 A1 | 8/2009 | Wilson et al. | |
| 2009/0221368 A1 | 9/2009 | Yen et al. | |
| 2009/0252423 A1 | 10/2009 | Zhu et al. | |
| 2009/0268945 A1 | 10/2009 | Wilson | |
| 2010/0004838 A1* | 1/2010 | Georgis et al. | 701/70 |
| 2010/0027843 A1 | 2/2010 | Wilson | |
| 2010/0063813 A1 | 3/2010 | Richter | |
| 2010/0103169 A1 | 4/2010 | Zhang | |
| 2010/0113153 A1 | 5/2010 | Yen et al. | |
| 2010/0121526 A1 | 5/2010 | Pham | |
| 2010/0123605 A1 | 5/2010 | Wilson | |
| 2010/0138798 A1 | 6/2010 | Wilson et al. | |
| 2010/0146455 A1 | 6/2010 | Wilson | |
| 2010/0146464 A1 | 6/2010 | Wilson | |
| 2010/0151946 A1 | 6/2010 | Wilson et al. | |
| 2010/0183192 A1 | 7/2010 | Fritsch | |
| 2010/0195867 A1 | 8/2010 | Kipman | |
| 2010/0197390 A1 | 8/2010 | Craig | |
| 2010/0210359 A1 | 8/2010 | Krzeslo | |
| 2010/0238160 A1 | 9/2010 | Yea | |
| 2010/0253624 A1 | 10/2010 | Wilson | |
| 2011/0001696 A1 | 1/2011 | Wilson | |
| 2011/0004329 A1 | 1/2011 | Wilson | |
| 2011/0041100 A1 | 2/2011 | Boillot | |
| 2011/0081044 A1 | 4/2011 | Peeper | |
| 2011/0081969 A1 | 4/2011 | Ikeda et al. | |
| 2011/0093778 A1 | 4/2011 | Kim et al. | |
| 2011/0105097 A1* | 5/2011 | Tadayon et al. | 455/418 |
| 2011/0106375 A1 | 5/2011 | Gurusamy Sundaram | |
| 2011/0124410 A1 | 5/2011 | Mao et al. | |
| 2011/0172015 A1 | 7/2011 | Ikeda et al. | |
| 2011/0195699 A1* | 8/2011 | Tadayon et al. | 455/418 |
| 2011/0211073 A1 | 9/2011 | Foster | |
| 2011/0275321 A1* | 11/2011 | Zhou et al. | 455/41.2 |
| 2011/0286676 A1 | 11/2011 | El Dokor | |
| 2011/0291926 A1 | 12/2011 | Gokturk | |
| 2011/0304444 A1 | 12/2011 | Zhang et al. | |
| 2012/0157207 A1 | 6/2012 | Craig | |
| 2012/0214472 A1 | 8/2012 | Tadayon et al. | |
| 2012/0265716 A1* | 10/2012 | Hunzinger | G06N 99/005 706/12 |
| 2012/0302349 A1 | 11/2012 | Marks et al. | |
| 2013/0069931 A1 | 3/2013 | Wilson et al. | |
| 2013/0134730 A1 | 5/2013 | Ricci | |
| 2013/0155237 A1 | 6/2013 | Paek et al. | |
| 2013/0157607 A1 | 6/2013 | Paek et al. | |
| 2013/0190089 A1 | 7/2013 | Wilson et al. | |
| 2013/0294016 A1 | 11/2013 | Wilson et al. | |
| 2013/0297246 A1 | 11/2013 | Wilson et al. | |
| 2013/0324248 A1 | 12/2013 | Wilson et al. | |
| 2014/0142729 A1 | 5/2014 | Lobb et al. | |
| 2014/0292654 A1 | 10/2014 | Wilson | |
| 2016/0116995 A1 | 4/2016 | Wilson | |

FOREIGN PATENT DOCUMENTS

| | | |
|---|---|---|
| CN | 201166702 Y | 12/2008 |
| CN | 101364814 A | 2/2009 |
| CN | 101795504 A | 8/2010 |
| CN | 201548210 U | 8/2010 |
| CN | 102204350 A | 9/2011 |
| CN | 102204650 A | 10/2011 |
| EP | 0 583 061 | 2/1994 |
| EP | 0739491 B1 | 4/2006 |
| EP | 2113431 A1 | 11/2009 |
| JP | 08-044490 | 2/1996 |
| JP | H1084405 A | 3/1998 |

(56) References Cited

FOREIGN PATENT DOCUMENTS

| | | |
|---|---|---|
| JP | H10308802 A | 11/1998 |
| JP | 2004312752 A | 11/2004 |
| JP | 2005173702 A | 6/2005 |
| JP | 2005-287830 | 10/2005 |
| JP | 2009257832 A | 11/2009 |
| JP | 2010072833 A | 4/2010 |
| JP | 20100262400 A | 11/2010 |
| KR | 10-2010-0116387 A | 11/2010 |
| WO | 93/10708 | 6/1993 |
| WO | 97/17598 | 5/1997 |
| WO | 99/44698 | 9/1999 |
| WO | 01-00463 A2 | 1/2001 |
| WO | 02/07839 | 1/2002 |
| WO | 2009059065 | 7/2009 |
| WO | 2010051455 A2 | 6/2010 |
| WO | 2011-149709 A1 | 12/2011 |

OTHER PUBLICATIONS

Yang et al., "Reconstruction of 3D Human Body Pose From Stereo Image Sequences Based on Top Down Learning," Proceedings of the 18th International Conference on Pattern Recognition, vol. 40, Issue 11, Nov. 1, 2007, pp. 3120-3131.

"First Office Action and Search Report," From Chinese Patent Application No. 201210548467.0, Mailed Feb. 28, 2015, 9 Pages.

Badler, "Face Modeling and Editing with Statistical Local Feature Control Models", International Journal of Imaging Systems and Technology, Apr. 2008.

De Campos, "Articulated Object Tracking and Pose Estimation: A Literature Survey", Excerpt from Doctorate Thesis, Saint Annes College, University of Oxford, 2006.

Kipman, "Virtual Target Tracking Using Model Fitting and Exemplar", U.S. Appl. No. 61/148,892, filed Jan. 30, 2009.

Lee, "Body Part Detection for Human Pose Estimation and Tracking", IEEE Workshop on Motion and Video Computing, Dec. 23-24, 2007.

Mikic, "Human Body Model Acquisition and Motion Capture Using Voxel Data", Proceedings of the 2nd Interational Workshop on Articulated Motion and Deformable Objects, Nov. 21-23, 2002.

Kanade, "A Stereo Machine for Video-Rate Dense Depth Mapping and Its New Applications", IEEE Computer Society Conference on Computer Vision and Pattern Recognition, Jun. 18-20, 1996.

Miyagawa, "CCD-Based Range-Finding Sensor", IEEE Transactions on Electron Devices, Oct. 1997.

Rosenhann, "Automatic Human Model Generation", Computer Analysis of Images and Patterns, Sep. 5-8, 2005.

Aggarwal, "Human Motion Analysis: A Review", IEEE Nonrigid and Articulated Motion Workshop, Jun. 16, 1997.

Shao, "An Open System Architecture for a Multimedia and Multimodel User Interface", Aug. 24, 1998.

Kohler, "Special Topics of Gesture Recognition Applied in Intelligent Home Environments", In Proceedings of the Gesture Workshop, Sep. 17-19, 1997.

Kohler, "Technical details and Ergonomical Aspects of Gesture Recognition Applied in Intelligent Home Environments", 1997.

Hasegawa, "Human-scale Haptic Interaction with a Reactive Virtual Human in a Real-time Physics Simulator", ACM Computers in Entertainment, Jul. 2008.

Qian, "A Gesture-driven Multimodal Interactive Dance System", IEEE International Conference on Multimedia and Expo, Jun. 27-30, 2004.

Zhao, "Dressed Human Modeling, Detection, and Parts Localization", Jul. 26, 2001.

He, "Generation of Human Body Models", Apr. 2005.

Isard, "Condensation—Conditional Density Propagation for Visual Tracking", International Journal of Computer Vision, Aug. 1998.

Livingston, "Vision-based Tracking with Dynamic Structured Light for Visual Tracking", International Journal Computer Vision, Aug. 1998.

Wren, "Pfinder: Real Time Tracking of the Human Body", IEEE Transactions of Pattern Analysis and Machine Intelligence, Jul. 1997.

Breen, "Interactive Occlusion and Collision of Real and Virtual Objects in Augmented Reality", European Computer-Industry Research Centre GmbH, 1995.

Freeman, "Television Control by Hand Gestures", Proceedings of the IEEE International Workshop on Automatic Face and Gesture Recognition. Jun. 1995.

Hongo, "Focus of Attention for Face and Hand Gesture Recognition Using Multiple Cameras", 4th IEEE International Conference on Automatic Face and Hand Gesture Recognition, Mar. 26-30, 2000.

Pavlovic, "Visual Interpretaion of Hand Gestures for Human-Computer Interaction: A Review", IEEE Transactions on Pattern Analysis and Machine Intelligence, Jul. 1997.

Azarbayejani et al., "Visually Controlled Graphics", IEEE Transactions on Pattern Analysis and Machine Intelligence, Jun. 1993.

Granieri, "Simulating Humans in VR", The British Computer Society, Oct. 12, 1994.

Brogan, "Dynamically Simulated Charachters in Virtual Envirnments", IEEE Computer Graphics and Applications, Sep. 1998.

Fisher, "Virtual Environment Display System", ACM Workshop on Interactive 3D Graphics, Oct. 23-24, 1986.

"Virtual High Anxiety", Tech Update, Aug. 1995.

Sheridan, "Virtual Reality Check", Technology Review, Oct. 1993.

Stevens, "Flights into Virtual Reality Treating Real World Disorders", The Washington Post, Mar. 27, 1995.

"Simulation and Training", Division Incorporated, 1994.

Park, "Segmentation and Tracking of Interacting Human Body Parts under Occlusion and Shadowing", Proceedings of the IEEE Workshop on Motion and Video Computing, Dec. 2002.

Moeslund, "A Survey of Advances in Vision-based Human Motion Capture and Analysis", Computer Vision and Image Understanding, Oct. 2, 2005.

Kehl, "Full Body Tracking from Multiple Views Using Stochastic Sampling", IEEE Computer Society Conference on Computer Vision and Pattern Recognition, Jun. 20-25, 2005.

Craig, "Pose Tracking Pipeline", U.S. Appl. No. 13/871,974, filed Apr. 26, 2013.

Dekker, "Building Symbolic Information for 3D Human Body Modeling from Range Data", Proceedings of the 2nd International Conference on 3-D Digital Imaging and Modeling, Oct. 4-8, 1999.

Sappa, "Monocular 3D Human Body Reconstruction Towards Depth Augmentation of Television Sequences", Proceedings of the IEEE International Conference on Image Processing, Sep. 1, 2003.

Trivedi, "Occupant Posture Analysis with Stereo and Thermal Infrared Video: Algorithms and Experimental Evaluation", Proceedings of the IEEE Transactions on Vehicular Technology, Nov. 2004.

Zhang, "Image-Based Modeling of Objects and Human Faces", Proceedings of the SPIE Conference on Videometncs and Optical Methods for 3D Shape Measurement, Jan. 21-26, 2001.

Navaratnam, "Heirarchical Part-Based Human Body Pose Estimation", Proceedings of the British Machine Vision Conference, Sep. 2005.

PCT International Search Report and Written Opinion for Application No. PCT/US2010/020793, Aug. 16, 2010.

Pekelny, "Articulated Object Reconstruction and Markerless Motion Capture from Depth Video", Eurographics, Apr. 14-18, 2008.

Rogez, "A Spatio-Temporal 2D-Models Framework for Human Pose Recovery in Monocular Sequences", Pattern Recognition, Sep. 2008.

Shaknarovich, "Fast Pose Estimation with Parameter Sensitive Hashing", Proceedings of the 9th Intenational Conference on Computer Vision, Oct. 14-17, 2003.

Zhou, "A Survey—Human Movement Tracking and Stroke Rehabilitation", University of Essex, Dec. 8, 2004.

Althoff, "Robust Multimodal Hand and Head Gesture Recognition for Controlling Automotive Infotainment Systems", Nov. 22-23, 2005.

(56) References Cited

OTHER PUBLICATIONS

Kern, "Design Space for Driver-Based Automotive User Interfaces", Proceedings of the First International Conference on Automotive User Interfaces and Interactive Vehicular Applications, Sep. 21-22, 2009.
Muller, "Multimodal Input in the Car, Today and Tomorrow", Industry and Standards, IEEE Multimedia, Jan. 2011.
PCT International Search Report and Written Opinion for Application No. PCT/US2012/069968, Reference 333981-03, Apr. 30, 2013.
Reissner, "Gestures and Speech in Cars", Proceedings of Joint Advanced Student School, Mar. 2007.
Alt, et al. "Enabling Micro-Entertainment in Vehicles Based on Context Information", Proceedings of the Second International Conference on Automotive User Interfaces and Interactive Vehicular Applications, Nov. 2010, pp. 177-124.
Graf, et al., "In-car Interaction using Search-Based User Interfaces", Proceedings of the 26th Annual SIGCHi Conference on Human Factors in Computing Systems, Apr. 2008, pp. 1685-1688.
Knies, Rob, "Managing Audio in Wheel Time", Microsoft Corporation, Redmond, WA, Feb. 25, 2006, 2 pages.
Lindqvist, et al., "Undistracted Driving: A Mobile Phone that Doesn't Distract" HotMobile 2011: 12th Workshop on Mobile Computing Systems and Applications, Mar. 2011, 6 pages.
"OnStar" Wikipedia Online Encyclopedia Entry. http://en.wikipedia.org/wiki/onstar, Dec. 15, 2011, 6 pages.
"EyeSight's Hand Gesture Recognition Technology Allows People to Interact with Devices Using Simple Hand Gestures", eyeSight, Herzliya, Israel, Dec. 14, 2011, 2 pages.
Paek et al. U.S. Appl. No. 13/327,787, "Interacting with a Mobile Device within a Vehicle Using Gestures", filed Dec. 16, 2011, 67 pages.
"International Search Report", Mailed Date: Mar. 20, 2013, Application No. PCT/US2012/068325, Filed Date: Dec. 7, 2012, 8 pages.
Riener, "Natural DVI Based on Intuitive Hand Gestures", Workshop on User Experience in Cars, Sep. 2011.
Wilson, "GWindows: Robust Stereo Vision for Gesture-Based Control of Windows", Proceedings of the 5th International Conference on Multimodal Interfaces, Nov. 5-7, 2003.
Wobbrock, "User-Defined Gestures for Surface Computing", Proceedings of the ACM CHI Conference on Human Factors in Computing Systems, Apr. 4-9, 2009.
Zobl, "A Usability Study on Hand Gesture Controlled Operation of In-Car Devices", Proceedings of the 9th International Conference on HCI, Aug. 5-10, 2001.
Supplementary Search Report mailed Aug. 4, 2015 from European Patent Application No. 12857653.5, 5 pages.
Examination mailed Aug. 14, 2015 from European Patent Application No. 12857653.5, 6 Pages.
First Office Action and Search Report, Mailed Date: Mar. 31, 2015, From China Patent Application No. 201210545421.3, 14 Pages.
European Search Report, Mailed Apr. 17, 2015, from European Patent Application No. 12857653.5, 6 pages.
Non-Final Office Action mailed Dec. 19, 2012 from U.S. Appl. No. 13/327,786, 27 pages.
Response filed Apr. 29, 2013 to Non-Final Office Action mailed Dec. 19, 2012 from U.S. Appl. No. 13/327,786, 12 pages.
Notice of Allowance and Examiner's Amendment mailed May 24, 2013 from U.S. Appl. No. 13/327,786, 13 pages.
Notice of Allowance mailed Apr. 14, 2014 from U.S. Appl. No. 13/327,786, 8 pages.
International Preliminary Report on Patentability mailed Jun. 17, 2014 from PCT Patent Application No. PCT/US2012/068235, 5 pages.
Response filed Aug. 5, 2015 from China Patent Application No. 201210545421.3, 8 pages.
Third Party Submission under 37 C.F.R. 1.290 filed Sep. 20, 2013 from U.S. Appl. No. 13/327,787, 12 pages.
Non-Final Office Action mailed Jan. 7, 2014 from U.S. Appl. No. 13/327,787, 11 pages.
Response filed Jun. 6, 2014 to Non-Final Office Action mailed Jan. 7, 2014 from U.S. Appl. No. 13/327,787, 12 pages.
Non-Final Office Action mailed Sep. 19, 2014 from U.S. Appl. No. 13/327,787, 15 pages.
Response filed Jan. 20, 2015 to Non-Final Office Action mailed Sep. 19, 2014 from U.S. Appl. No. 13/327,787, 13 pages.
Non-Final Office Action mailed May 26, 2015 from U.S. Appl. No. 13/327,787, 13 pages.
Response filed Aug. 12, 2015 to Non-Final Office Action mailed May 26, 2015 from U.S. Appl. No. 13/327,787, 13 pages.
Response filed Jun. 18, 2015 from China Patent Application No. 201210548467.0, 4 pages.
Second Office Action mailed Oct. 10, 2015 from China Patent Application No. 201210548467.0, 9 pages.
International Preliminary Report on Patentability mailed Jun. 17, 2014 from PCT Patent Application No. PCT/US2012/069968, 6 pages.
Final Office Action mailed Nov. 16, 2015 from U.S. Appl. No. 13/327,787, 16 pages.
Office Action mailed Nov. 30, 2015 from China Patent Application No. 201210545421.3, 15 pages.
Response filed Dec. 9, 2015 from European Patent Application No. 12857653.5, 19 pages.
Request for Examination and Amendment filed Nov. 24, 2015 from Japan Patent Application No. 2014-547303, 7 pages.
Guiard, Yves, "Asymmetric Division of Labor in Human Skilled Bimanual Action: The Kinematic Chain as a Model", Journal of Motor Behavior, 1987, vol. 19, No. 4, 24 pages.
Horvitz, Eric, "Principles of Mixed-Initiative User Interfaces", Proceedings of CHI, 1999, 8 pages.
Jojic et al., "Dectection and Estimation of Pointing Gestures in Dense Disparity Maps", Proceedings of IEEE International Conference on Automatic Face and Gesture Recognition, 2000, France, 8 pages.
Kabbash, Paul and William Buxton, "The "Prince" Technique: Fitts' Law and Selection Using Area Cursors", Proceedings of CHI'95, 1995, 11 pages.
Kanade, Takeo, "Development of a Video-Rate Stereo Machine", Proceedings of 94 ARPA Image Understanding Workshop, Nov. 14-16, 1994, 4 pages.
Kettebekov, Sanshzar and Rajeev Sharma, "Toward Natural Gesture/Speech Control of a Large Display", Proceedings of the 8th IFIP International Conference on Engineering for Human-Computer Interaction, Technical Report CVMT 03-01, ISSN 1601-3646, 2001, 13 pages.
Kjeldsen, Frederik C. M., "Visual Interpretation of Hand Gestures as a Practical Interface Modality", Ph.D. Dissertation, 1997, Columbia University Department of Computer Science, 178 pages.
Kohler, Markus, "Vision Based Remote Control in Intelligent Home Environments", University of Dortmund, Germany, 1996, 8 pages.
Krahnstoever et al., "Mutimodal Human-Computer Interaction for Crisis Management Systems", Proceedings of the Sixth IEEE Workshop on Applications of Computer Vision, 2002, 5 pages.
Krum et al., "Speech and Gesture Multimodal Control of a Whole Earth 3D Visualization Environment", Proceedings of Eurographics-IEEE Visualization Symposium, 2002, 8 pages.
Long, Jr., et al., "Implications for a Gesture Design Tool", Proceedings of CHI'99, 1999, University of California at Berkeley, last accessed Jul. 8, 2005, 8 pages.
Maes et al., "The ALIVE System: Wireless, Full-body Interaction with Autonomous Agents", ACM Multimedia Systems, Special Issue on Multimedia and Multisensory Virtual Worlds, 1995, 17 pages.
Moeslund, Thomas B. and Erik Granum, "A Survey of Computer Vision-Based Human Motion Capture," Computer Vision and Image Understanding: CVIU, vol. 81, No. 3, 2001, 38 pages.
Moyle, Michael and Andy Cockburn, "Gesture Navigation: An Alternative 'Back' for the Future", Proceedings of CHI'02, 2002, University of Canterbury, Christchurch, New Zealand, 2 pages.
Nielsen et al., "A Procedure for Developing Intuitive and Erogonomic Gesture Interfaces or Man-Machine Interaction," Technical Report CVMT 03-01, ISSN 1601-3646, CVMT, Aalborg University, Mar. 2003, 12 pages.

(56) References Cited

OTHER PUBLICATIONS

Oh et al. "Evaluating Look-to-Talk: A Gaze-Aware Interface in a Collaborative Environment", CHI'02, 2002, Cambridge. MA, USA, last accessed Jul. 8, 2005, 3 pages.
Oviatt, Sharon, "Ten Myths of Multimodal Interaction," Communications of the ACM, vol. 42, No. 11, Nov. 1999, 8 pages.
Rigoll et al., "High Performance Real-Time Gesture Recognition Using Hidden Markov Models," Gesture and Sign Language in Human-Comptuer Interaction, vol. LNAI 1371, Germany, 1997, 12 pages.
Schmidt, Greg and Donald House, "Towards Model-Based Gesture Recognition", Texas A&M, 2000, 6 pages.
Sharma et al., "Speech-Gesture Driven Multiomodal Interfaces for Crisis Management," Proceedings of IEEE Special Issue on Multimodal Human-Computer Interface, 48 pages.
Walker et al., "Age-Related Differences in Movement Control: Adjusting Submovement Structure to Optimize Performance", Journals of Gerontology, Jan. 1997, vol. 52B, No. 1, 14 pages.
Welford, Alan T., "Signal, Noise, Performance, and Age", Human Factors, 1981, pp. 97-109, vol. 23, Issue 1, 13 pages.
Wilson, Andrew D. and Aaron F. Bobick, "Hidden Markov Models for Modeling and Recognizing Gesture Under Variation", World Scientific, 2001, 36 pages.
Worden et al., "Making Computers Easier for Older Adults to Use: Area Cursors and Sticky Icons," CHI 97, 1997, Atlanta, Georgia, USA, 6 pages.
Yoda, Ikushi and Katsuhiko Sakaue, "Utilization of Stereo Disparity and Optical Flow information for Human Interaction", Proceedings of the Sixth International Conference on Computer Vision, IEEE Computer Society, Washington, D.C., USA, 1998, 6 pages.
Zhai et al., "The "Silk Cursor": Investigating Transparency for 3D Target Acquisition", CHI 94, Apr. 24-28, 1994, Boston, MA, 7 pages.
Zhang, Zhengyou, "A Flexible New Technique for Camera Calibration", IEEE Transactions on Pattern Analysis and Machine Intelligence, Nov. 2000, vol. 22, No. 11, 5 pages.
Zhang, Zhengyou, "Flexible Camera Calibration by Viewing a Plane from Unknown Orientations", Microsoft Research 1999, IEEEm 8 pages.
Aviles-Arriaga et al., "Dynamic Bayesian networks for visual recognition of dynamic gestures", Dec. 2002, Journal of Intelligent & Fuzzy Systems, 10 pages.
Azarbayejani, Ali and Alex Pentland, "Real-Time Self-Calibrating Stereo Person Tracking Using 3-D Shape Estimation from Blob Features", Proceedings of ICPR'96, Aug. 1996, Vienna, Austria, 6 pages.
Azoz et al., "Reliable Tracking of Human Arm Dynamics by Multiple Cue Integration and Constraint Fusion", IEEE conference on Computer Vision and Pattern Recognition, 1998, 6 pages.
Baudel, Thomas and Michel Beaudouin-Lafon, "Charade: Remote Control of Objects using Free-Hand Gestures", Communications of the ACM, vol. 36, No. 7, Jul. 1993, 10 pages.
Berard, Francois, "The Perceptual Window: Head Motion as a new Input Steam", Proceedings of the Seventh IFIP conference of Human-Computer Interaction, 1999, 8 pages.
Buxton, William and Brad A. Meyers, "A Study in Two-Handed Input", Proceedings of CHI'86, Apr. 1986, 6 pages.
Cedras, Claudette and Mubarak Shah, "Motion-based recognition: a survey", IEEE Proceedings, Image and Vision computing, vol. 13, No. 2, Mar. 1995, 27 pages.
Darrell et al., "Integrated person tracking using stereo, color, and pattern detection.", 1998, IEEE, 10 pages.
Horvitz, Erik and Tim Paek, "A Computational Architecture for Conversation", Proceedings of the Seventh International Conference on User Modeling, 1999, 10 pages.
Fitzgerald, Will and R. James Firby, "Multimodal Event Parsing for Intelligent User Interfaces", IUI Conference, Jan. 12-15, 2003, Miami, Florida, 8 pages.
Mignot et al., "An Experimental Study of Future 'Natural' Multimodal Human-Computer Interaction", Proceedings of INTERCHI93, 1993, 2 pages.
"GWindows: Light-weight Stereo Vision for Interaction," retrieved from <<http://research.com/~nuria/gwindows/gwindows.htm>> on Jul. 7, 2005, 2 pages.
Wilson, Andrew and Nuria Oliver, Gwindows: Towards Robust Perception-Based UI, Microsoft Research, 2003, 8 pages.
Filing transaction history from U.S. Appl. No. 10/396,653, filed Mar. 25, 2003, 527 pages.
Filing transaction history from U.S. Appl. No. 10/724,950, filed Dec. 1, 2003, 1476 pages.
Non-Final Office Action mailed May 14, 2013 from U.S. Appl. No. 12/289,099, 23 pages.
Filing transaction history from U.S. Appl. No. 12/494,303, filed Jun. 30, 2009, 850 pages.
Filing transaction history from U.S. Appl. No. 12/705,014, filed Feb. 12, 2010, 846 pages.
Filing transaction history from U.S. Appl. No. 12/705,113, filed Feb. 12, 2010, 797 pages.
Filing transaction history from U.S. Appl. No. 12/457,656, filed Jun. 17, 2009, 310 pages.
Filing transaction history from U.S. Appl. No. 12/495,105, filed Jun. 30, 2009, 355 pages.
Non-Final Office Action mailed Jan. 20, 2015 from U.S. Appl. No. 13/919,995, filed Jun. 17, 2013, 18 pages.
Response filed Feb. 4, 2016 to the Second Office Action mailed Nov. 30, 2015 from China Patent Application No. 201210545421.3, 11 pages.
Response filed Dec. 25, 2015 to the Second Office Action mailed Oct. 10, 2015 from China Patent Application No. 201210548467.0, 11 pages.
Non-Final Office Action mailed Mar. 28, 2016 from U.S. Appl. No. 12/705,014, 20 pages.
Response filed Mar. 28, 2016 to the Final Office Action mailed Nov. 16, 2015 from U.S. Appl. No. 13/327,787, 14 pages.
Examination Report mailed Apr. 7, 2016 from European Patent Application No. 128576535, 5 pages.
Non-Final Office Action mailed May 3, 2016 from U.S. Appl. No. 12/494,303, 13 pages.
Final Office Action mailed Apr. 25, 2016 from U.S. Appl. No. 12/705,113, 11 pages.
Preliminary Amendment mailed Jul. 20, 2015 from U.S. Appl. No. 14/803,949, 48 pages.
Notice to File Corrected Application Papers mailed Aug. 5, 2015 from U.S. Appl. No. 14/803,949, 2 pages.
Applicant Response to Pre-Exam Formalities Notice filed Jan. 5, 2016 to Notice to File Corrected Application Papers mailed Aug. 5, 2015 from U.S. Appl. No. 14/803,949, 140 pages.
U.S. Appl. No. 12/230,440 titled "System and Method for Determining 3D Orientation of a Pointing Device," filed Aug. 28, 2008 by inventor Andrew Wilson, 101 pages.
U.S. Appl. No. 12/076,224 titled "System for Displaying and Controlling Electronic Objects," filed Mar. 14, 2008 by inventor Andrew Wilson, 93 pages.
Response filed May 17, 2016 to the Examination Report mailed Apr. 7, 2016 from European Patent Application No. 12857653.5, 13 pages.
Davies, Chris, "Qualcomm Buys GestureTek Gesture-Recognition Tech for Snapdragon", published on Jul. 25, 2011, captured by the Internet archive at <<https://web.archive.org/web/20111010005912/http://www.slashgear.com/qualcomm-buys-gesturetek-gesture-recognition-tech-for-snapdragon-25167335/>> on Oct. 10, 2011, 6 pages.
Woyke, Elizabeth, "Texas Instruments Sees Big Market for Smartphone Gesture Recognition", published on Oct. 31, 2011, captured by the Internet archive at <<https://web.archive.org/web/20111101203247/http://www.forbes.com/sites/elizabethwoyke/2011/10/31/texas-instruments-sees-big-market-for-smartphone-gesture-recognition/>> on Nov. 1, 2011, 4 pages.
Notice of Allowance mailed May 4, 2016 from China Patent Application No. 201210548467.0, 4 pages.

(56) References Cited

OTHER PUBLICATIONS

Third Office Action mailed Jun. 3, 2016 from China Patent Application No. 20120545421.3, 6 pages.
Response filed Jun. 28, 2016 to the Non-Final Office Action mailed Mar. 28, 2016 from U.S. Appl. No. 12/705,014, 8 pages.
Response filed Jul. 25, 2016 to the Final Office Action mailed Apr. 25, 2016 from U.S. Appl. No. 12/705,113, 7 pages.
"BMW Innovation Days Highlight Future BMW Technologies", retrieved from <<http://f30.bimmerpost.com/forums/showthread.php?t=594473>>, Oct. 5, 2011, 50 pages.
Akyol et al., "Gesture Control for use in Automobiles", Proceedings of MVA2000, IAPR Workshop on Machine Vision Applications, Nov. 28-30, 2000, 4 pages.
Bose et al., "Terminal Mode—Transforming Mobile Devices into Automotive Application Platforms", Proceedings of the Second International Conference on Automotive User Interfaces and Interactive Vehicular Applications, Nov. 11-12, 2010, 8 pages.
Diewald et al., "Mobile Device Integration and Interaction in the Automotive Domain", Proceedings of the 3rd International Conference on Automotive User Interfaces and Interactive Vehicular Applications, Nov. 29-Dec. 2, 2011, 4 pages.
Whitfield, Kermit, "Gesture Interfaces for Automotive Control: (Beyond Digital Expletives)", 7th Journal for Automotive Design and Production, Jul. 15, 2003, 5 pages.
Response filed Aug. 3, 2016 to the Non-Final Office Action mailed May 3, 2016 from U.S. Appl. No. 12/494,303, 11 pages.
Response filed Aug. 4, 2016 to the Third Office Action mailed Jun. 3, 2016 from China Patent Application No. Response 55 pages.
Final Office Action mailed Aug. 26, 2016 from U.S. Appl. No. 12/705,014, 13 pages.
Final Office Action mailed Sep. 26, 2016 from U.S. Appl. No. 12/494,303, 14 pages.
Summons to Attend Oral Proceedings pursuant to Rule 115(1) mailed Sep. 16, 2016 from European Patent Application No. 12857653.5, 5 pages.
Office Action mailed Nov. 1, 2016 from Japanese Patent Application No. 2014-547303, 4 pages.
Notification on Grant of Patent Right for Invention mailed Nov. 2, 2016 from Chinese Patent Application No. 201210545421.3, 3 pages.
Response filed Oct. 26, 2016 to the Final Office Action mailed Aug. 26, 2016 from U.S. Appl. No. 12/705,014, 10 pages.
Advisory Action and After Final Consideration Program Decision mailed Nov. 4, 2016 from U.S. Appl. No. 12/705,014, 4 pages.
Requirement for Restriction/Election mailed Sep. 26, 2016 from U.S. Appl. No. 14/803,949, 11 pages.
Applicant Initiated Interview Summary mailed Dec. 7, 2016 from U.S. Appl. No. 12/705,014, 3 pages.
Non-Final Office Action mailed Dec. 7, 2016 from U.S. Appl. No. 13/327,787, 12 pages.
Advisory Action, Applicant-Initiated Interview Summary, and After Final Consideration Pilot Program Decision mailed Dec. 22, 2016 from U.S. Appl. No. 12/494,303, 6 pages.
Response filed Dec. 23, 2016 to the Final Office Action mailed Sep. 26, 2016 from U.S. Appl. No. 12/494,303, 9 pages.
Amended Response filed Dec. 12, 2016 to the Final Office Action mailed Aug. 26, 2016 from U.S. Appl. No. 12/705,014, 10 pages.
Notice of Allowance mailed Jan. 23, 2017 from U.S. Appl. No. 12/705,113, 10 pages.
Response filed Jan. 26, 2017 to the Requirement for Restriction/Election mailed Sep. 26, 2016 from U.S. Appl. No. 14/803,949, 3 pages.
Applicant-Initiated Interview Summary mailed Jan. 26, 2017 from U.S. Appl. No. 13/327,787, 3 pages.

\* cited by examiner

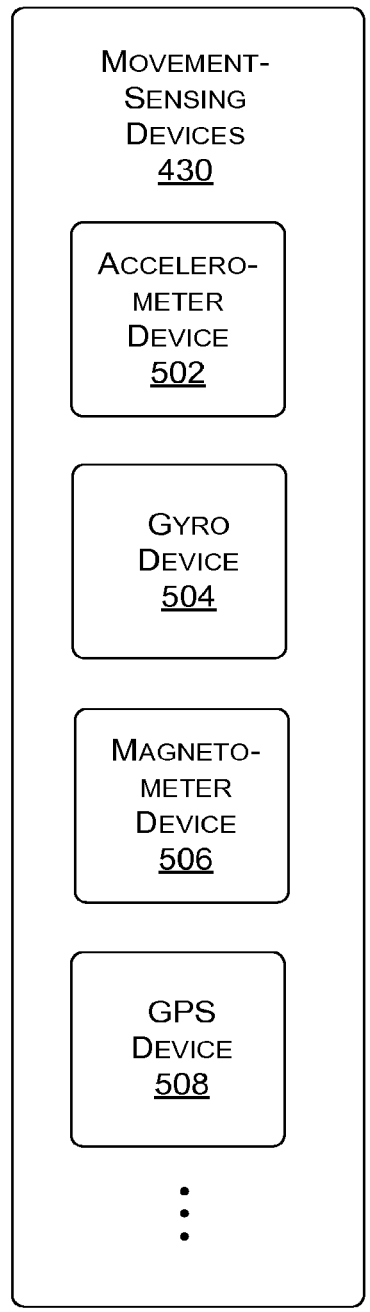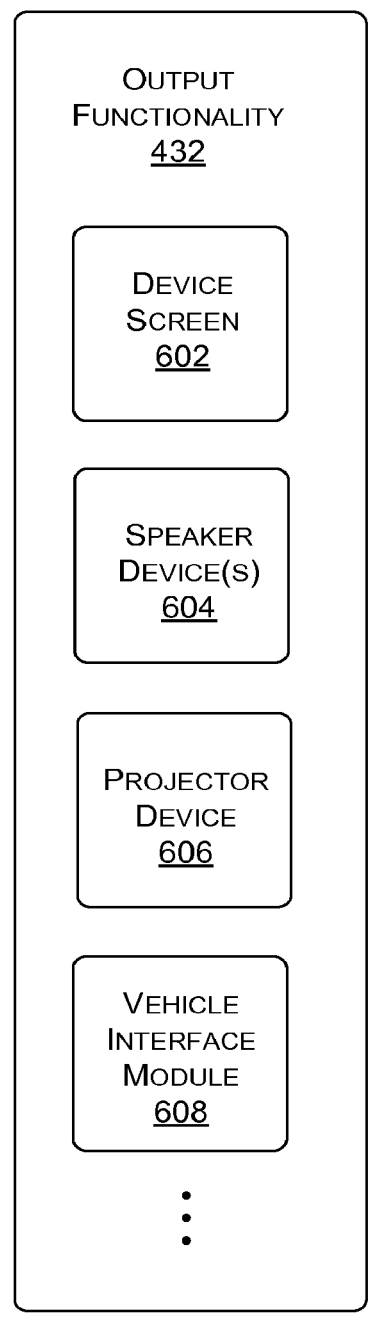
FIG. 5                    FIG. 6

EXAMPLE SCENARIO A:
BASED ON WHETHER THE
VEHICLE IS MOVING OR NOT
MOVING

RECEIVE INFERENCE-INPUT
INFORMATION
1902

↓

DETERMINE WHETHER THE
VEHICLE IS MOVING BASED
ON THE INFERENCE-INPUT
INFORMATION
1904

↓

IF THE VEHICLE IS MOVING,
MAKE ANY CHANGES
OUTLINED IN FIG. 14
1906

FIG. 19

EXAMPLE SCENARIO B:
BASED ON THE MANNER IN
WHICH THE VEHICLE IS
MOVING

RECEIVE INFERENCE-INPUT
INFORMATION
2002

↓

CLASSIFY THE MANNER IN
WHICH THE VEHICLE IS
MOVING BASED ON THE
INFERENCE-INPUT
INFORMATION
2004

↓

BASED ON THE
CLASSIFICATION, MAKE
ANY CHANGES OUTLINED
IN FIG. 14
2006

FIG. 20

EXAMPLE SCENARIO C:
BASED ON WHETHER THE
VEHICLE IS IN A CERTAIN
REGION

RECEIVE INFERENCE-INPUT
INFORMATION
2102

DETERMINE THE REGION THAT THE VEHICLE
IS TRAVELING THROUGH, AND DETERMINE
THE IMPLICATIONS REGARDING A LEVEL AND
TYPE OF ATTENTION THAT IS APPROPRIATE
FOR THE USER TO MAINTAIN WHILE IN THAT
REGION
2104

MAKE ANY CHANGES
OUTLINED IN FIG. 14 BASED
ON THE ASSESSMENT OF
THE REGION
2106

FIG. 21

PROVIDING A USER INTERFACE EXPERIENCE BASED ON INFERRED VEHICLE STATE

BACKGROUND

A user who is driving a vehicle may wish to interact with his or her mobile device. For example, a user may wish to make and receive calls, conduct searches, read Email, and so forth. These activities may distract the user from the primary task of driving the vehicle, and therefore pose a significant risk to the safety of the user (as well as the safety of others). To address this issue, many jurisdictions have enacted laws which prevent users from manually interacting with mobile devices in their vehicles.

One solution to the above concerns is to outright preclude a user from interacting with his or her mobile phone while driving the vehicle. In another solution, a user can use various hands-free interaction devices. For example, a user can use voice recognition technology to initiate a call. The user can then conduct the call using a headset or the like, without holding the mobile device. While these solutions may help the user reduce the risk of using his or her mobile device in certain circumstances, they do not provide a generally satisfactory solution to the myriad distractions that may confront a user while driving.

SUMMARY

A mobile device is described herein that provides a user interface experience to a user who is operating the mobile device within a vehicle. The mobile device performs this task using mode functionality. The mode functionality operates by receiving inference-input information from one or more input sources. At least one input source corresponds to a movement-sensing device provided by the mobile device. The mode functionality device then infers a state of the vehicle (i.e., a "vehicle state") based on the inference-input information. The mode functionality then presents a user interface experience to the user that is appropriate in view of the vehicle state. More specifically, the mode functionality presents a user interface experience to the user that imposes certain attention-related demands; those attention-related demands are appropriate in view of the vehicle state. For example, the mode functionality may present a user interface experience that provides minimal demands on the attention of the user when the vehicle state indicates that the vehicle is traveling at a high speed.

In one scenario, the mode functionality can also infer, based on the inference-input information, that the vehicle is in a distress condition, e.g., as a result of an accident or other mishap. In response to this assessment, the mode functionality can provide assistance to the user. In one case, the mode functionality can infer that the vehicle is in a distress condition based on evidence, gleaned from the inference-input information, that: (a) the mobile device is located in a vehicle; (b) the vehicle has come to an abrupt stop or otherwise abruptly decelerated; and (c) the mobile device has become dislodged from its mount (or where a subset of these events have occurred).

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows illustrative movement-sensing devices that can be used by the mobile device of FIG. 4.

FIG. 6 shows illustrative output functionality that can be used by the mobile device of FIG. 4 to present output information.

FIGS. 19-21 show three different instantiations of the procedure of FIG. 18, corresponding to three different vehicle state scenarios.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for providing a user interface experience that depends on an inferred vehicle state. Section B describes illustrative methods which explain the operation of the functionality of Section A. Section C describes illustrative computing functionality that can be used to implement any aspect of the features described in Sections A and B.

Figure 23:
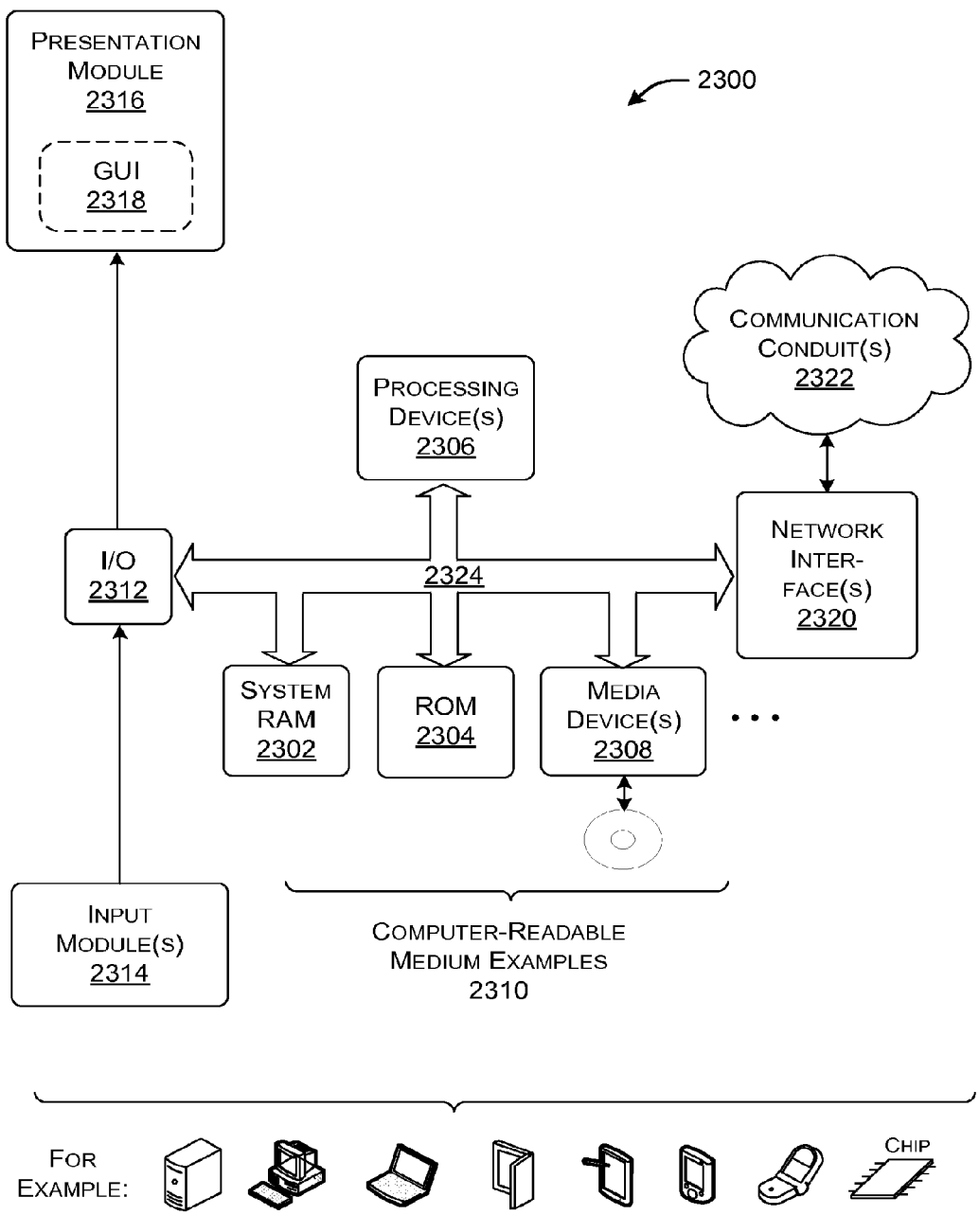
FIG. 23 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 23, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Mobile Device and its Environment of Use

Figure 1:
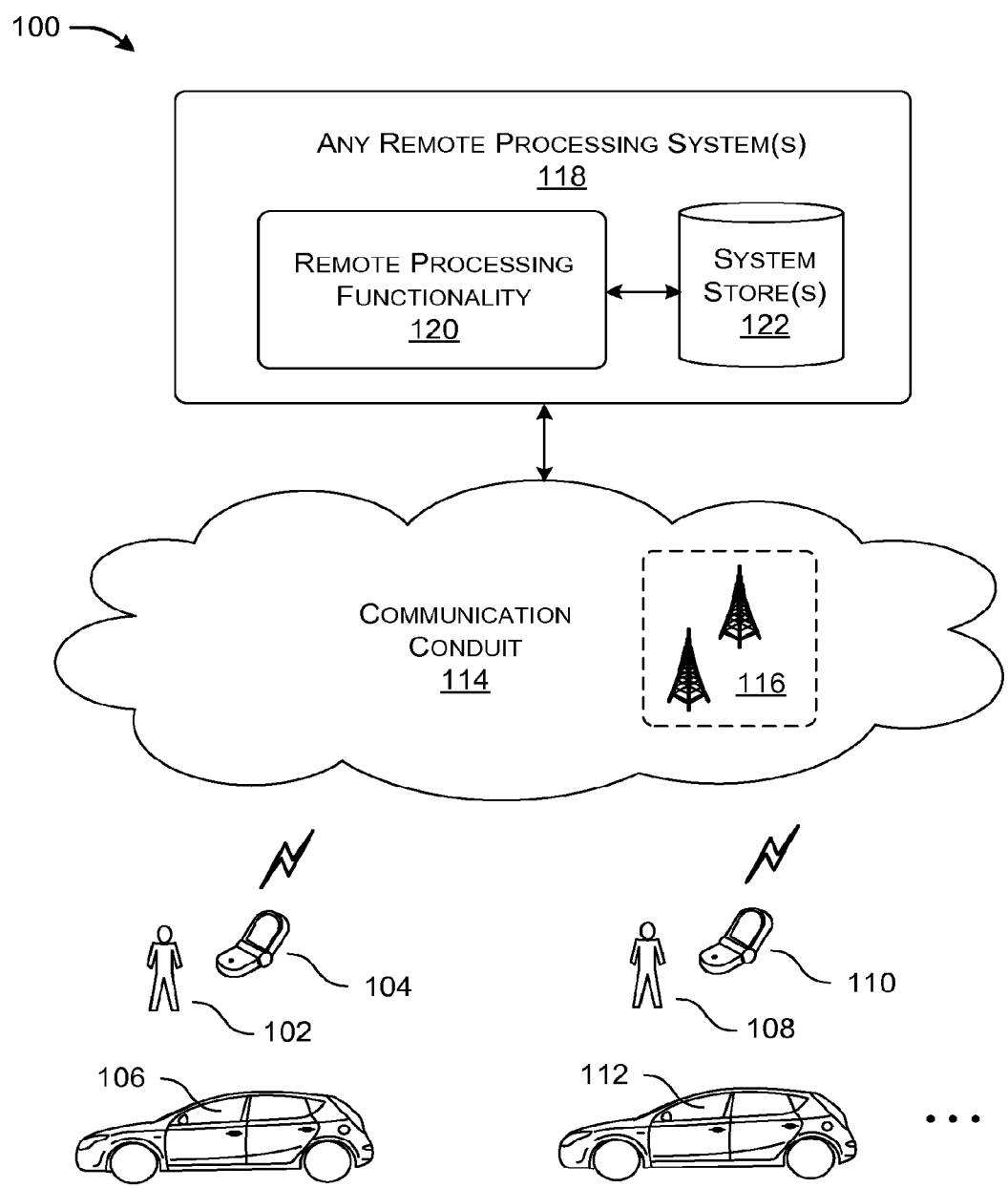
FIG. 1 shows an illustrative environment in which a user receives a user interface experience that is based on an inferred state of a vehicle (i.e., a vehicle state).

FIG. 1 shows an illustrative environment 100 in which users can operate mobile devices within vehicles. For example, FIG. 1 depicts an illustrative user 102 who operates a mobile device 104 within a vehicle 106, and a user 108 who operates a mobile device 110 within a vehicle 112. However, the environment 100 can accommodate any number of users, mobile devices, and vehicles. To simplify the explanation, this section will set forth the illustrative composition and manner of operation of the mobile device 104 operated by the user 102, treating this mobile device 104 as representative of any mobile device's operation within the environment 100. Moreover, in certain cases, this explanation will state that the mobile device 104 performs certain processing functions. This statement is to be construed liberally. In some cases, the mobile device 104 can perform a function by providing logic which executes this function. Alternatively, or in addition, the mobile device 104 can perform a function by interacting with a remote entity, which performs the function on behalf of the mobile device 104.

More specifically, the mobile device 104 operates in at least two modes. In a handheld mode of operation, the user 102 can interact with the mobile device 104 while holding it in his or her hands. For example, the user 102 can interact with a touch input device of the mobile device 104 and/or a keypad of the mobile device 104 to perform any device function. In a vehicle mode of operation, the user 102 can interact with the mobile device 104 in his or her vehicle 106. In this mode, the mobile device 104 automatically assesses the state of the vehicle 106 (i.e., the "vehicle state" according to the terminology used herein) based on inference-input information. The mobile device 104 then presents a user interface experience based on the vehicle state, as set forth below in greater detail.

By way of overview, the vehicle state of the vehicle state characterizes the manner in which the vehicle 106 is currently being operated by the user 102. Some aspects of the vehicle state may directly pertain to the dynamics of the vehicle's movement. Such direct aspects can include, but are not limited to: the speed at which the vehicle 106 is traveling; the manner in which the vehicle 106 is being accelerated and decelerated; the manner in which the vehicle 106 is being steered; the manner in which the breaks of the vehicle 106 are being applied, and so on. Other aspects of the vehicle state may have a more indirect bearing on the manner in which the vehicle 106 is moving. For example, these aspects of the vehicle state may pertain to the qualifying circumstances in which vehicle 106 movement is taking place. Such indirect aspects can include, but are not limited to: the region in which the vehicle 106 is traveling; the time of day in which the vehicle 106 is traveling; the date at which the vehicle 106 is traveling; the weather through which the vehicle 106 is traveling; the road condition over which the vehicle 106 is traveling, and so forth.

The mobile device 104 can determine the vehicle state based on inference-input information. The inference-input information pertains to any information that can be used to infer the vehicle state. Some of the inference-input information may originate from input sources which are internal to the mobile device 104. Other inference-input information may originate from input sources which are external to the mobile device 104.

Ultimately, the vehicle state correlates to an attention profile. The attention profile characterizes a level of attention and a type of attention which is appropriate for the user 102 to maintain while driving within the vehicle state. For example, assume that the vehicle state indicates that the user 102 is traveling at a high rate of speed in a congested urban area. Based on these considerations, the mobile device 104 may reach the conclusion that it is appropriate for the user 102 to pay close attention to the task of operating the vehicle 106. In contrast, assume that the vehicle state indicates that the user 102 is sitting in his vehicle 106, stopped in a traffic jam. In this circumstance, the mobile device 104 can reach the conclusion that it is permissible for the user 102 to devote greater attention to supplemental non-driving-related tasks (compared to the first scenario).

The mobile device 104 then presents a user interface experience that makes attention-related demands on the user 102 that are commensurate with the vehicle state. In other words, the mobile device 104 engages the user 102 in a manner that is appropriate in view of the attention profile of the vehicle state, e.g., by not demanding a level and type of attention that goes beyond what the user 102 can "afford" to provide while driving the vehicle 106. For example, in the first scenario described above (in which the user 102 is traveling at high speed in a congested area), the mobile device 104 can present a user interface experience which places few if any demands on the attention of the user 102. In the second scenario described above (in which the user 102 is sitting in his or her vehicle 106 without moving), the mobile device 104 can place far greater demands on the attention of the user 102.

The mobile device 104 can provide an appropriate user interface experience in different ways. Generally, a user interface experience refers to the manner in which a user 102 interacts with the mobile device 104, either by providing user-input information to the mobile device 104 or receiving output information from the mobile device 104. More specifically, the manner in which the user 102 provides user-input information to the mobile device 104 is defined by various input modes that a user 102 can use to provide the user-input information to the mobile device 104. Illustrative input modes can include a keypad input mode, a touch screen input mode, a voice-recognition input mode, a gesture-recognition input mode, and so on (to be described in greater detail below). The manner in which the mobile device 104 provides output information to the user is defined by various output modes. Illustrative output modes can include a display output mode, a speech output mode, and so on (to be described in greater detail below). The mobile device 104 can vary the user interface experience by activating and/or deactivating certain input modes and/or output modes. Alternatively, or in addition, the mobile device 104 can vary the user interface experience by changing the manner of operation of any input mode and/or any output mode (again, to be described in greater detail below).

Given the above overview, the description will now advance to a more detailed description of the individual features depicted in FIG. 1. Starting with the mobile device 104 itself, this apparatus can be implemented in any manner and can perform any function or combination of functions. For example, the mobile device 104 can correspond to a mobile telephone device of any type (such as a smart phone device), a book reader device, a personal digital assistant device, a laptop computing device, a tablet-type computing device, a netbook-type computing device, a portable game device, a portable media system interface module device, and so on.

The vehicle 106 can correspond to any mechanism for transporting the user 102. For example, the vehicle 106 may correspond to an automobile of any type, a truck, a bus, a motorcycle, a scooter, a bicycle, an airplane, a boat, and so on. However, to facilitate explanation, it will henceforth be assumed that the vehicle 106 corresponds to a personal automobile operated by the user 102.

The environment 100 also includes a communication conduit 114 for allowing the mobile device 104 to interact with any remote entity (where a "remote entity" means an entity that is remote with respect to the user 102). For example, the communication conduit 114 may allow the user 102 to use the mobile device 104 to interact with another user who is using another mobile device (such as the user 108 who is using the mobile device 110). In addition, the communication conduit 114 may allow the user 102 to interact with any remote services. Generally speaking, the communication conduit 114 can represent a local area network, a wide area network (e.g., the Internet), or any combination thereof. The communication conduit 114 can be governed by any protocol or combination of protocols.

More specifically, the communication conduit 114 can include wireless communication infrastructure 116 as part thereof. The wireless communication infrastructure 116 represents the functionality that enables the mobile device 104 to communicate with remote entities via wireless communication. The wireless communication infrastructure 116 can encompass any of cell towers, base stations, central switching stations, satellite functionality, and so on. The communication conduit 114 can also include hardwired links, routers, gateway functionality, name servers, etc.

The environment 100 also includes one or more remote processing systems 118. The remote processing systems 118 provide any type of services to the users. In one case, each of the remote processing systems 118 can be implemented using one or more servers and associated data stores. For instance, FIG. 1 shows that the remote processing systems 118 can include at least one instance of remote processing functionality 120 and an associated system store 122. The ensuing description will set forth illustrative functions that the remote processing functionality 120 can perform that are germane to the operation of the mobile device 104 within the vehicle 106.

Figure 2:
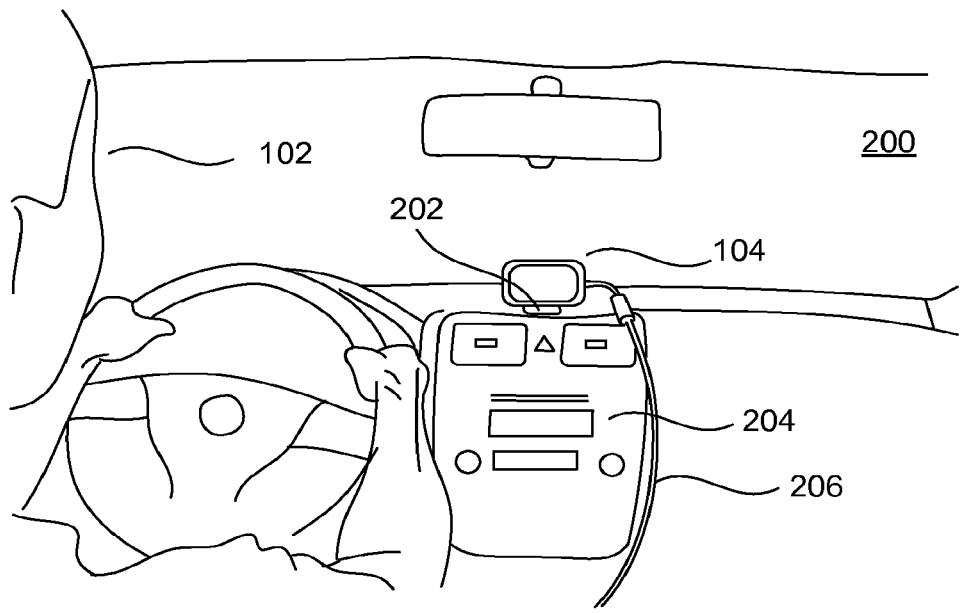
FIG. 2 depicts an interior region of a vehicle. The interior region includes a mobile device secured to a surface of the vehicle using a mount.

Advancing to FIG. 2, this figure shows a portion of a representative interior region 200 of the vehicle 106. A mount 202 secures the mobile device 104 within the interior region 200. More specifically, the mount 202 secures the mobile device 104 to the top of the vehicle's dashboard, to the left of the user 102, just above the vehicle control panel region 204. A power cord 206 supplies power from any power source provided by the vehicle 106 to the mobile device 104 (either directly or indirectly, as will be described in connection with FIG. 7).

The mobile device 104 can include at least one internal camera device (not shown in FIG. 2) having a field of view that projects out from a face of the mobile device 104, towards the user 102. More specifically, the user 102 can place the mobile device 104 within the interior region 200 in such a manner that the field of view of the camera device encompasses at least a part of the anatomy of the user 102. In one implementation, this placement enables the internal camera device to establish an interaction space. The internal camera device can capture gestures made by the user 102 within that interaction space. In one illustrative implementation, the interaction space may generally correspond to a conic volume that extends approximately 60 cm from the face of the mobile device 104, pointed towards the user 102 who is driving the vehicle 106 (although different end-use environments can adopt interaction spaces having different "sizes" and shapes).

However, the placement of the mobile device 104 shown in FIG. 2 is merely representative, meaning that the user 102 can choose other locations and orientations of the mobile device 104. For example, the user 102 can place the mobile device 104 in a left region with respect to the steering wheel, instead of a right region with respect to the steering wheel (as shown in FIG. 2). This might be appropriate, for example, in countries in which the steering wheel is provided on the right side of the vehicle 106. Alternatively, the user 102 can place the mobile device 104 directly behind the steering wheel or on the steering wheel. Alternatively, the user 102 can secure the mobile device 104 to the windshield of the vehicle 106. These options are mentioned by way of illustration, not limitation; still other placements of the mobile device 104 are possible.

Figure 3:
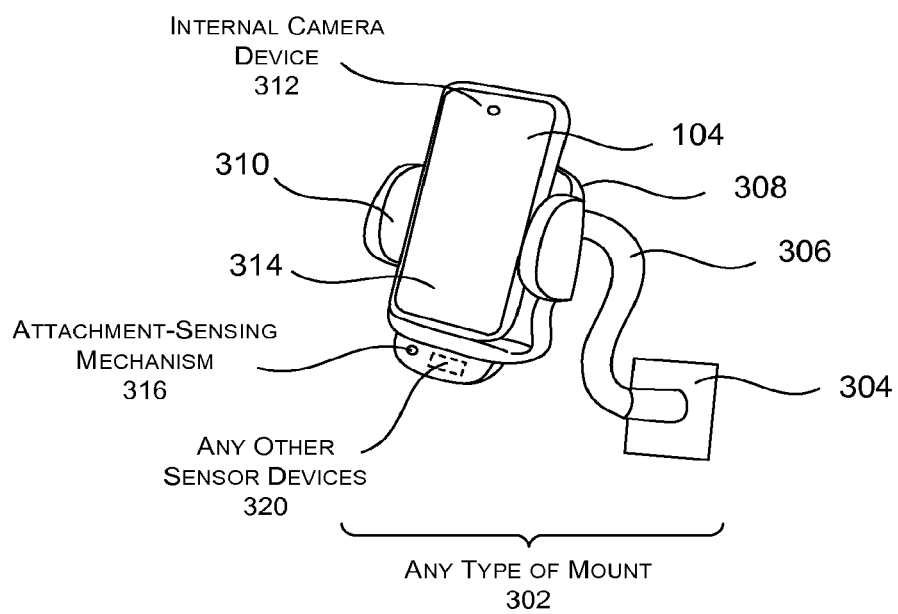
FIG. 3 shows one type of representative mount that can be used to secure the mobile device within a vehicle.

FIG. 3 shows one merely representative mount 302 that can be used to secure the mobile device 104 to some surface of the interior region 200 of the car. (Note that this mount 302 is a different type of mount than the mount 202 shown in FIG. 2). Without limitation, the mount 302 of FIG. 3 includes any type of coupling mechanism 304 for fastening the mount 302 to a surface within the interior region 200. For instance, the coupling mechanism 304 can include a clamp or protruding member (not shown) that attaches to an air movement grill of the vehicle 106. In other cases, the coupling mechanism 304 can include a plate or other type of member which can be fastened to any surface of the vehicle 106 using any type of fastener (e.g., screws, clamps, a Velcro coupling mechanism, a sliding coupling mechanism, a snapping coupling mechanism, a suction cup coupling mechanism, etc.). In still other cases, the mount 302 can merely sit on a generally horizontal surface of the interior region 200, such as on the top of the dashboard, without being fastened to that surface. To reduce the risk of this type of mount sliding on the surface during movement of the vehicle 106, it can include a weighted member, such as a sand-filled malleable base member.

In one merely illustrative implementation, the representative mount 302 shown in FIG. 3 includes a flexible arm 306 which extends from the coupling mechanism 304 and terminates in a cradle 308. The cradle 308 can include an adjustable clamp mechanism 310 for securing the mobile device 104 to the cradle 308. In this particular scenario, the user 102 has attached the mobile device 104 to the cradle 308 so that it can be operated in a portrait mode. But the user 102 can alternatively attach the mobile device 104 so that it can be operated in a landscape mode (as shown in FIG. 2).

As mentioned above, the mobile device 104 includes at least one internal camera device 312 which projects out from a front face 314 of the mobile device 104 (or other face of the mobile device 104). The internal camera device 312 is identified as "internal" insofar as it is typically considered an integral part of the mobile device 104. In addition, the mobile device 104 can receive image information from one or more external camera devices (not shown).

Further, the mount 302 may incorporate any attachment-sensing mechanism 316 for determining when the mobile device 104 has been inserted in the cradle 308 of the mount 302. For example, the attachment-sensing mechanism 316 can comprise a mechanical switch that that is toggled from an OFF to an ON state when the user 102 inserts the mobile device 104 into the cradle 308, and from an ON to OFF state when the mobile device 104 becomes dislodged from the cradle 308. Other implementations of the attachment-sensing device include a light-sensing switch, a pressure-sensing switch, and so on. Alternatively, or in addition, the mobile device 104 can implement an attachment sensing mechanism (not shown). That is, in complementary fashion, a device-implemented attachment sensing mechanism is configured to be activated when the user 102 places the mobile device 104 in the cradle 308. Alternatively, or in addition, the mobile device 104 can infer the fact that it has become dislodged from the cradle 308 based on indirect evidence. In any implementation, as will be described below, the attachment-sensing mechanism 316 plays a role in determining whether the vehicle 106 is in a distress condition.

Further, the mount 302 can include one or more supplemental sensor devices 320 (depicted generically in FIG. 3 by a dashed box). For example, the sensor devices 320 can encompass one or more of the types of movement-sensing devices 430 shown in FIG. 5 (to be described below). In addition, the mount 302 can encompass additional image-sensing mechanisms, such one or more additional camera devices of any type, etc.

Figure 4:
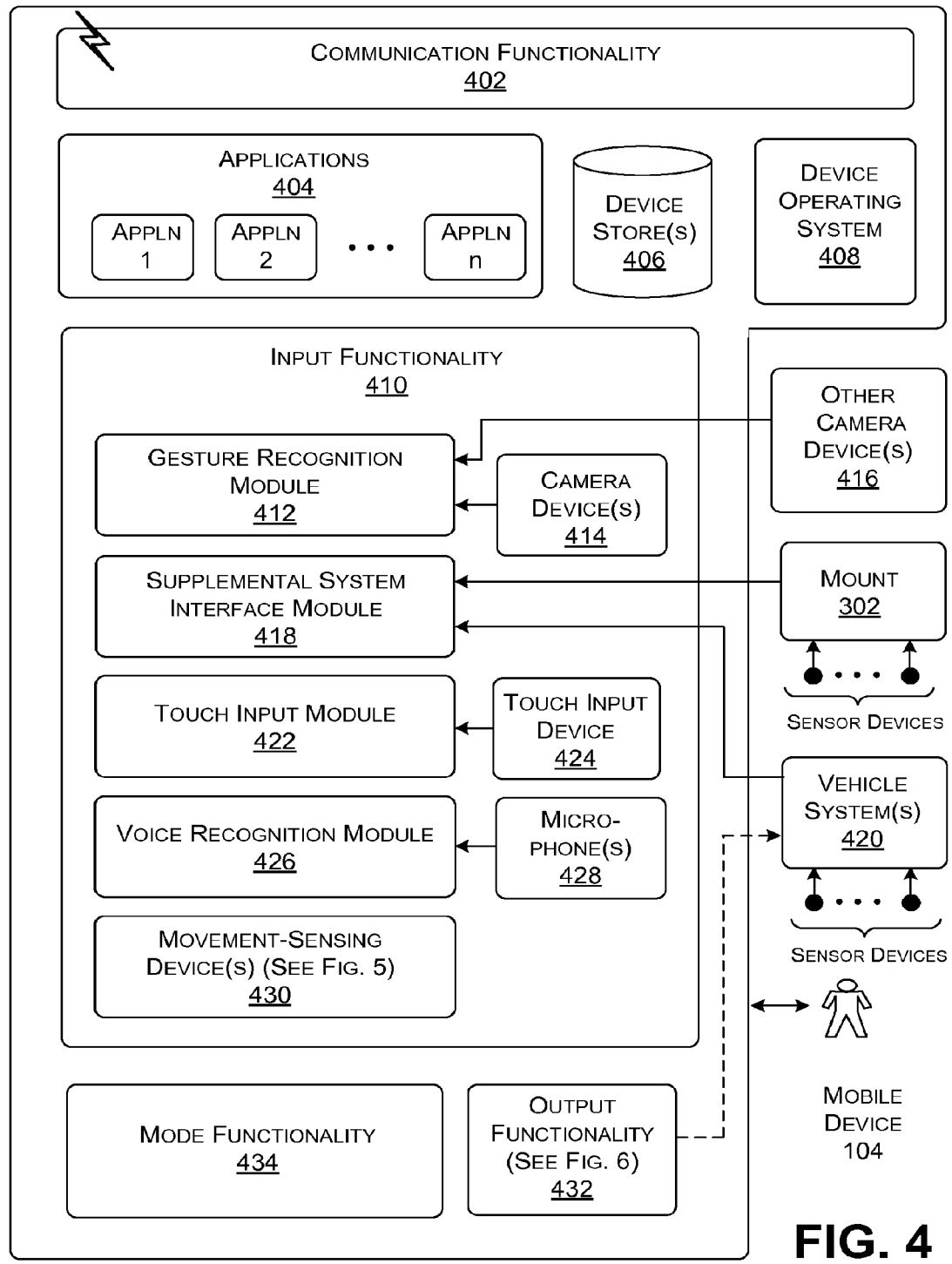
FIG. 4 shows one illustrative implementation of a mobile device, for use in the environment of FIG. 1.

FIG. 4 shows various components that can be used to implement the mobile device 104. This figure will be described in a generally top-to-bottom manner. To begin with, the mobile device 104 includes communication functionality 402 for receiving and transmitting information to remote entities via wireless communication. That is, the communication functionality 402 may comprise a transceiver that allows the mobile device 104 to interact with the wireless communication infrastructure 116 of the communication conduit 114.

The mobile device 104 can also include a set of one or more applications 404. The applications 404 represent any type of functionality for performing any respective tasks. In some cases, the applications 404 perform high-level tasks. To cite representative examples, a first application may perform a map navigation task, a second application can perform a media presentation task, a third application can perform an Email interaction task, and so on. In other cases, the applications 404 perform lower-level management or support tasks. The applications 404 can be implemented in any manner, such as by executable code, script content, etc., or any combination thereof. The mobile device 104 can also include at least one device store 406 for storing any application-related information, as well as other information.

In other implementations, at least part of the applications 404 can be implemented by the remote processing systems 118. For example, in certain implementations, some of the applications 404 may represent network-accessible pages and/or other type of functionality.

The mobile device 104 can also include a device operating system 408. The device operating system 408 provides functionality for performing low-level device management tasks. Any application can rely on the device operating system 408 to utilize various resources provided by the mobile device 104.

The mobile device 104 can also include input functionality 410 for receiving and processing input information. Generally, the input functionality 410 includes some functionality for receiving input information from internal input devices (which represent components that are part of the mobile device 104 itself), and some functionality for receiving input information from external input devices. The input functionality 410 can receive input information from external input devices using any coupling technique or combination of coupling techniques, such as hardwired connections, wireless connections (e.g., Bluetooth® connections), and so on.

This explanation refers to the input information that is ultimately used to infer the state of the vehicle 106 as inference-input information. This explanation refers to the input information that is provided by the user 102 as user-input information. These two classes of input information are not necessarily mutually exclusive; that is, some of the information that is input by a user 102 may constitute inference-input information. A generic reference to "input information," without the qualifier "user" or "inference," refers to any type of input information.

The input functionality 410 includes an optional gesture recognition module 412 for receiving image information from at least one internal camera device 414, and/or from at least one external camera device 416. (For example, the external camera device 416 can be associated with the mount 302, or by some other unit within the vehicle 106.) Any of these camera devices can provide any type of image information. For example, in one case, a camera device can provide video image information, produced by receiving visible-spectrum radiation, infrared-spectrum radiation, etc., or combination thereof. In another case, a camera device can provide image information that can be further processed to provide depth information. Depth information provides an indication of the distances between different points in a captured scene and a reference point (e.g., corresponding to the location of the camera device). Depth processing functionality can generate depth information using any technique, such as a time-of-flight technique, a structured light technique, a stereoscopic technique, and so on. After receiving the image information, the gesture recognition module 412 can determine whether the image information reveals that the user 102 has made a recognizable gesture.

The input functionality 410 can also receive image information from one or more camera devices that capture a scene that is external to the vehicle 106. For example, an internal or external camera device can capture a scene in front of the vehicle 106, in back of the vehicle 106, to either side of the vehicle 106, etc. These camera devices can also be used in conjunction with any type depth processing functionality described above. The use of depth processing functionality allows the mobile device 104 to assess the distance between the vehicle 106 and other nearby vehicles and obstacles. The input functionality 410 can also receive inference-input information from any other type of distance sensing mechanism, such as a Light Detection And Ranging (LIDAR) sensing device, etc.

The input functionality 410 can also include a supplemental system interface module 418. The supplemental system interface module 418 receives inference-input information from any vehicle system 420, and/or from the mount 302, and/or from any other external system. For example, the supplemental system interface module 418 can receive any type of OBDII information provided by the vehicle's information management system. Such information can describe the operating state of the vehicle 106 at a particular point in time, such as by providing information regarding the vehicle's speed, steering state, breaking state, engine temperature, engine performance, odometer reading, oil level, fuel level, the presence of passengers in the vehicle 106, and so on. To provide this information, the vehicle system 420 can receive sensor information from a plurality of sensing devices provided by the vehicle 106. Alternatively, or in addition, the supplemental system interface module 318 can receive inference-input information collected by one or more sensor devices (such as one or more supplemental accelerometer devices provided by the mount 302).

The input functionality 410 can also include a touch input module 422 for receiving user-input information when a user 102 touches a touch input device 424. Although not depicted in FIG. 4, the input functionality 410 can also include any type of physical keypad input mechanism, any type of joystick control mechanism, any type of mouse device mechanism, and so on. The input functionality 410 can also include a voice recognition module 426 for receiving voice commands from one or more microphone devices 428.

The input functionality 410 can also include one or more movement-sensing devices 430. Generally, the movement-sensing devices 430 determine the manner in which the mobile device 104 is being moved at any given time. That information, in turn, can pertain to either the dynamic movement of the mobile device 104 and/or its position at any given time. Advancing momentarily to FIG. 5, this figure indicates that the movement-sensing devices 430 can include any of an accelerometer device 502, a gyro device 504, a magnetometer device 506, a GPS device 508 (or other satellite-based position-determining mechanism), a dead-reckoning position-determining device (not shown), a cell tower or WiFi triangulation device (not shown), and so on. Further, the movement-sensing device 430 can include any type of vision device described above, e.g., corresponding to one or more camera devices and associated functionality. That is, the images captured by the vision device comprise evidence regarding the movement of the vehicle 106; therefore, the vision device can be considered as a type of movement-sensing device. This set of possible devices is representative, rather than exhaustive. In other cases, some other entity (besides, or in addition to the mobile device 104) can assess the movement of the mobile device 104, such as any functionality provided by the remote processing systems 118.

The mobile device 104 also includes output functionality 432 for conveying information to a user 102 in an output presentation. Advancing momentarily to FIG. 6, this figure indicates that the output functionality 432 can include any of a device screen 602, one or more speaker devices 604, a projector device 606 for projecting output information onto any surface, and so on.

The output functionality 432 also includes a vehicle interface module 608 that enables the mobile device 104 to send output information to any vehicle system 420 associated with the vehicle 106. This allows the user 102 to interact with the mobile device 104 to control the operation of any functionality associated with the vehicle 106 itself. For example, the user 102 can interact with the mobile device 104 to control the playback of media content on a separate vehicle media system. The user 102 may prefer to directly interact with the mobile device 104 rather than the systems of the vehicle 106 because the user 102 is presumably already familiar with the manner in which the mobile device 104 operates. Moreover, the mobile device 104 has access to a remote system store 122 which can provide user-specific information. The mobile device 104 can leverage this information to control any vehicle system 420 in a manner that is customized for a particular user 102.

Finally, the mobile device 104 can optionally include mode functionality 434. The mode functionality 434 performs the core functions summarized above, which include assessing the state of the vehicle 106 at a particular point in time and providing a user interface experience that takes into consideration the vehicle state. Alternatively, at least parts of the mode functionality 434 can be implemented by the remote processing systems 118.

Figure 7:
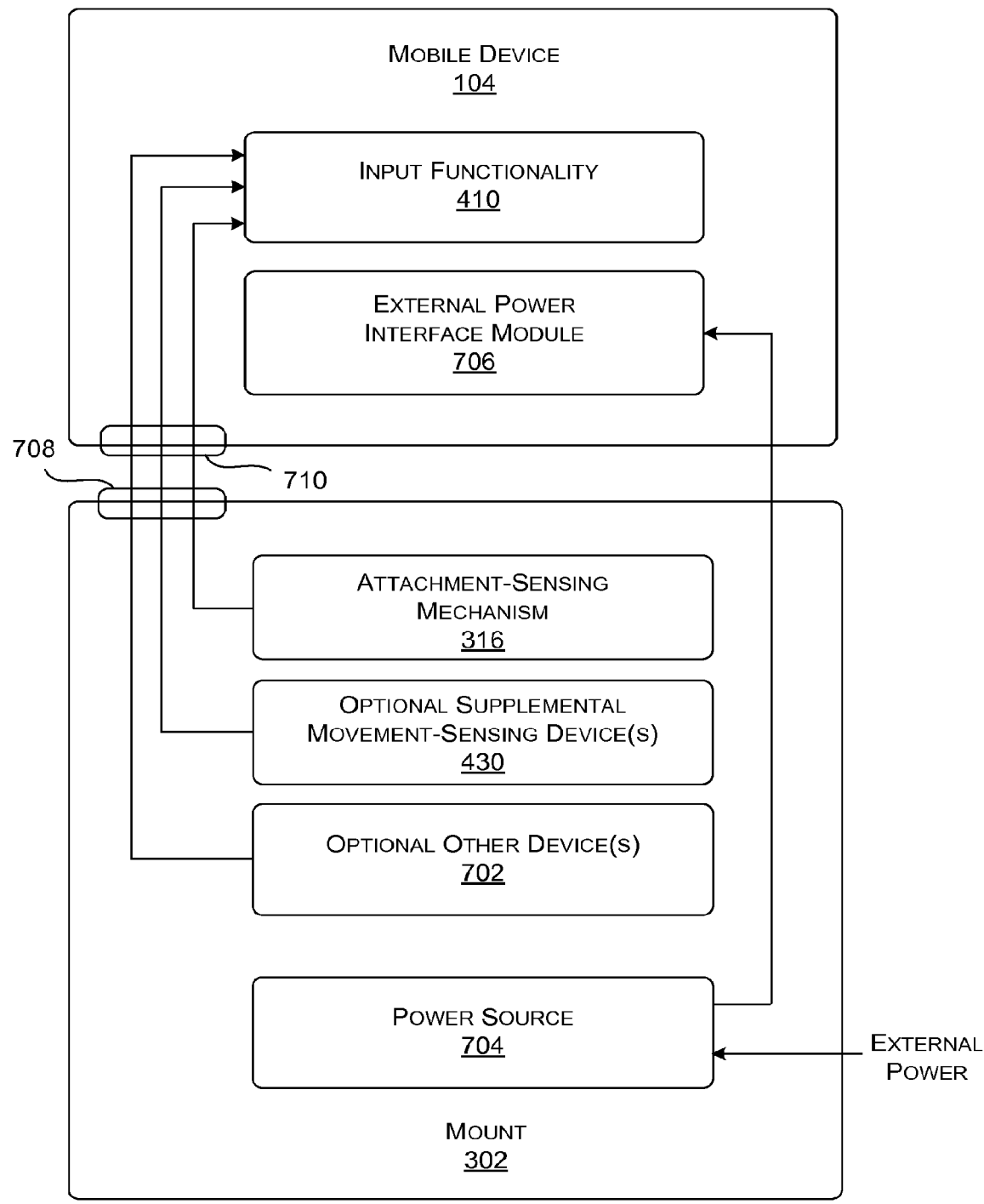
FIG. 7 shows illustrative functionality associated with the mount of FIG. 3, and the manner in which this functionality can interact with the mobile device.

FIG. 7 illustrates one manner in which the functionality provided by the mount 302 (of FIG. 3) can interact with the mobile device 104. The mount 302 can include the attachment sensing mechanism 316 (described above) which provides an attachment signal to the input functionality 410 of the mobile device 104. The attachment signal indicates whether or not the mobile device 104 is presently coupled to the mount 302. The mount 302 can also include any of the type of the movement-sensing devices 430 shown in FIG. 5 for providing inference-input information to the input functionality 410 of the mobile device 104. The mount 302 can also include any other optional devices 702 for providing inference-input information to the input functionality 410 of the mobile device 104. Alternatively, or in addition, the devices 702 can perform various processing functions, and can then send the results of such processing to the mobile device 104.

The mount 302 can also include a power source 704 which feeds power to the mobile device 104, e.g., via an external power interface module 706 provided by the mobile device 104. The power source 704 may, in turn, receive power from any external source, such as a power source (not shown) associated with the vehicle 106. In this implementation, the power source 704 powers both the components of the mount 302 and the mobile device 104. Alternatively, each of the mobile device 104 and the mount 302 can be supplied with separate sources of power.

Finally, FIG. 7 shows interfaces (708, 710) that allow the input functionality 410 of the mobile device 104 to communicate with the components of the mount 302.

Figure 8:
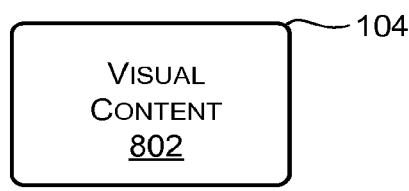
FIGS. 8 and 9 depict two respective output modes provided by the mobile device of FIG. 4.
Figure 9:
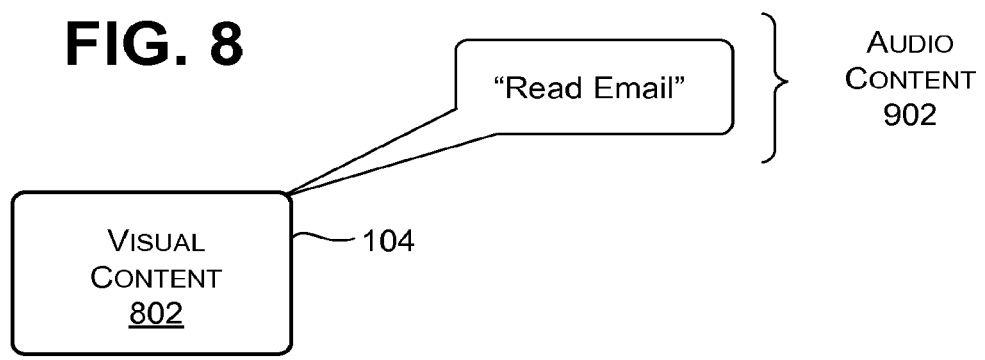

FIGS. 8 and 9 pictorially summarize two output modes. That is, in FIG. 8, the mobile device 104 presents visual content 802 on the display screen 602 of the mobile device 104. In FIG. 9 the mobile device 104 presents audio content 902 that supplements or replaces the visual content 802.

Figure 10:
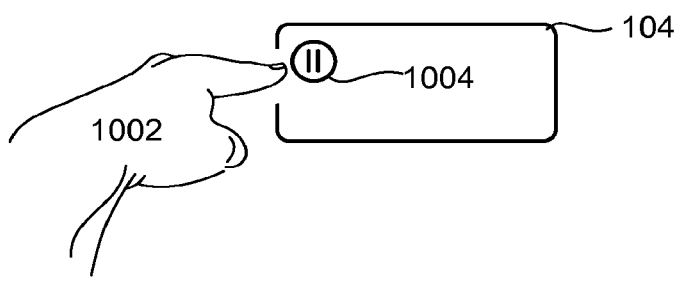
FIGS. 10-12 depict three respective input modes provided by the mobile device of FIG. 4.
Figure 11:
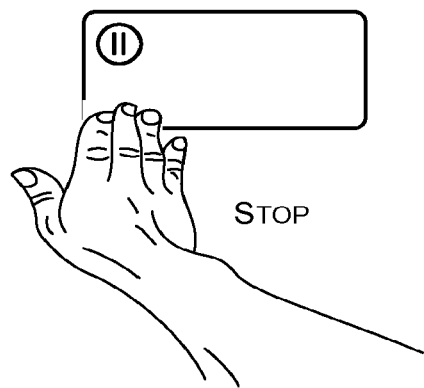
Figure 12:
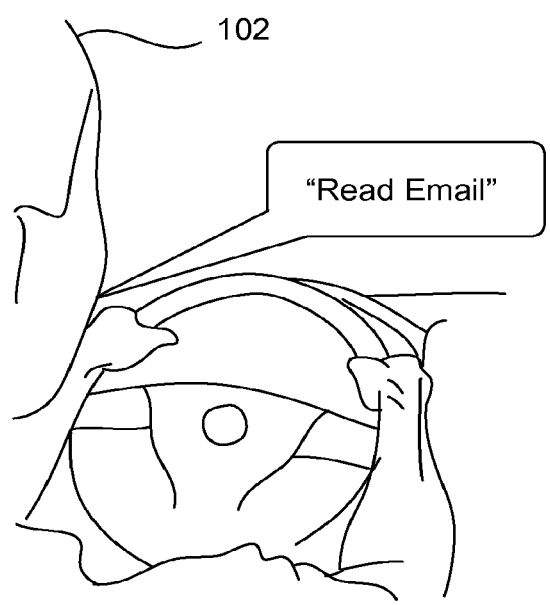

FIGS. 10-12 pictorially summarize three input modes. That is, in FIG. 10, the touch input module 422 accepts user-input information when the user 102 uses a hand 1002 to touch an icon 1004 or other object presented on a touch input screen of the mobile device 104. In FIG. 11, the gesture recognition module 412 receives user-input information when the user 102 makes a gesture that is captured by the internal camera device 414 of the mobile device 104, without touching the mobile device 104. The gesture recognition module 412 can recognize this gesture by comparing the captured image information with candidate gesture information associated with each of a set of possible candidate gestures. In FIG. 12, the voice recognition module 426 receives user-input information when the user 102 annunciates a voice command.

Figure 13:
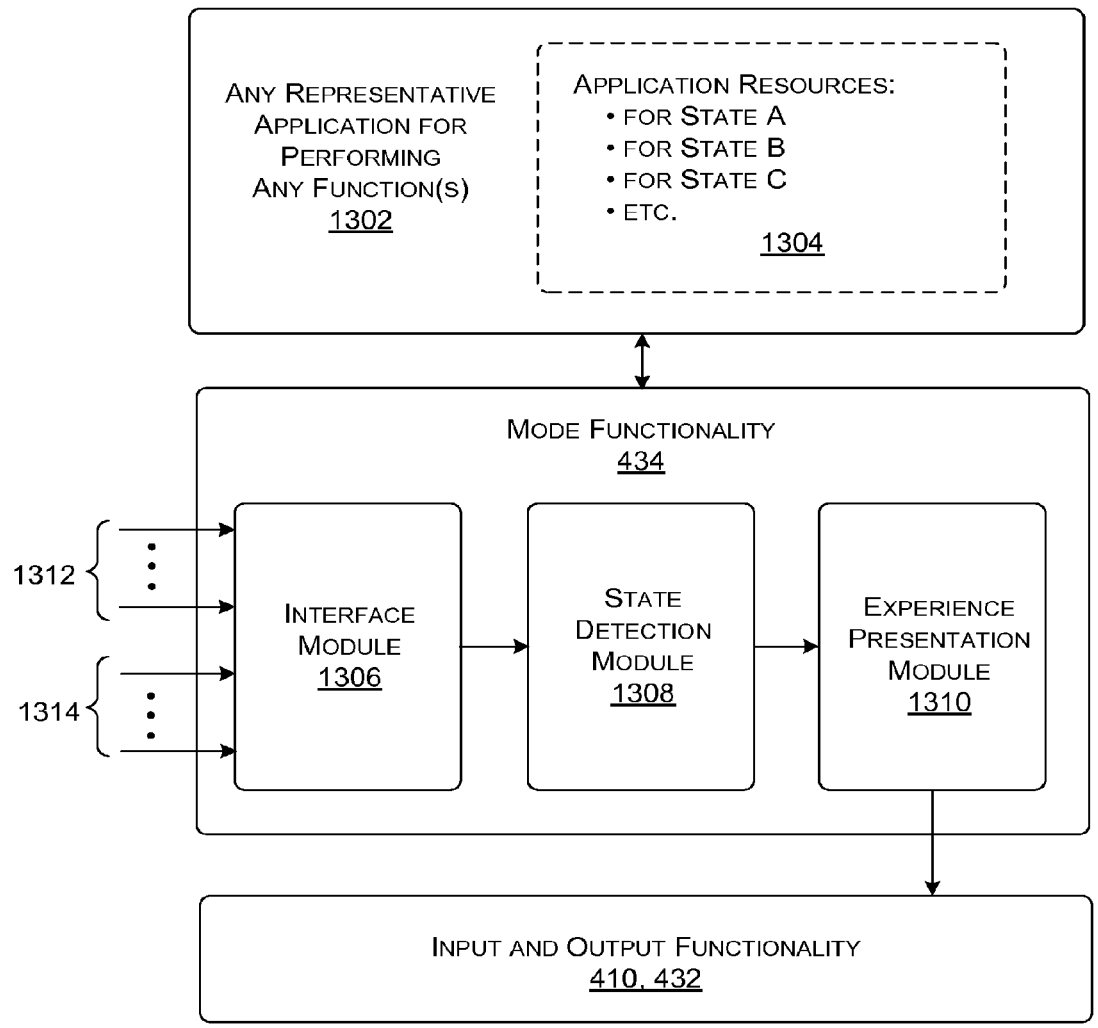
FIG. 13 shows further details regarding a representative application and mode functionality, which can be provided by the mobile device of FIG. 4.

FIG. 13 shows additional information regarding a subset of the components of the mobile device 104, introduced above in the context of FIGS. 4-7. The components include a representative application 1302 and the mode functionality 434. As the name suggests, the "representative application" 1302 represents one of the set of applications 404 that may run on the mobile device 104 (and/or may run on remote processing functionality).

More specifically, FIG. 13 depicts the representative application 1302 and the mode functionality 434 as separate entities that perform respective functions. However, any aspect of the mode functionality 434 can be alternatively, or in addition, be performed by the representative application 1302. Similarly, any aspect of the representative application 1302 can alternatively, or in addition, be performed by the mode functionality 434. Further, the components shown in FIG. 13 are described herein as being performed by the mobile device 104. However, alternatively, or in addition, at least some of the functions of the representative application 1302 and the mode functionality 434 can be performed by any functionality of the remote processing systems 118 and/or the mount 302.

The representative application 1302 can be conceptualized as comprising a set of resources 1304. The application resources 1304 represent image content, text content, audio content, programmatic content, control settings, etc. that the representative application 1302 may use to provide its services. Moreover, in some cases, a developer can provide multiple collections of resources for invocation in different vehicle states. For example, assume that there are two principal vehicle states: moving and not moving. The developer can provide a first collection of interface icons and prompting messages that the mobile device 104 can present in the moving state, and a second collection of interface icons and prompting messages that the mobile device 104 can present in a non-moving state. The moving-state collection can differ from the non-moving-state collection. For example, the moving-state collection can use larger size icons and fonts compared to the non-moving-state collection. During execution of the application, the mode functionality 434 can determine the vehicle state at a particular time. In response, the mode functionality 434 can invoke the moving-collection collection to provide a user interface experience in the moving state and the non-moving-collection to provide a user interface experience in the non-moving state. (As will be described below, the mode functionality 434 can make other changes to produce an appropriate user interface experience.)

The two-collection example is merely illustrative; other applications can provide more than two classes of resource collections corresponding to different respective ways in which the vehicle 106 is being driven. For example, a developer can create a resource collection for use for a nighttime driving vehicle state and a resource collection for a daytime driving vehicle state (as well as a resource collection for a non-moving state).

In the above type of development environment, the developer can consult an appropriate software development kit (SDK) to assist him or her in creating the different sets of resources. The SDK describes various requirements and recommendations regarding the characteristics of resources to be used in different vehicle states. For example, the SDK can require or recommend that the developer use fonts no smaller than a certain size for certain vehicle states.

Advancing now to a description of the mode functionality 434, this component is shown as comprising three submodules: an interface module 1306, a state detection module 1308, and an experience presentation module 1310. To facilitate description, it will be assumed that all of the logic for implementing these three functions is indeed encapsulated in a unit being referred to as the mode functionality 434. But as stated above, any aspect of the mode functionality 434 can be alternatively, or in addition, performed by the representative application 1302 and/or some other entity (such as the remote processing systems 118).

The interface module 1306 receives various forms of inference-input information. A subset 1312 of the instances of inference-input information originates from input sources that are associated with the mobile device 104 itself Another subset 1314 of the instances of inference-input information originates from input sources that are external to the mobile device 104 (e.g., from the vehicle system 420, the mount 302, etc.).

For example, the subset 1312 of internal instances of inference-input information can originate from any of the movement-sensing devices 430 enumerated in FIG. 5. The subset 1312 can also include image information received from one or more internal camera devices which capture a scene or scenes inside the vehicle 106 and/or outside the vehicle 106. The subset 1312 can also include audio information captured by one or more microphone devices.

The subset 1314 of instances of external inference-input information can originate from any sensor devices which feed sensor information into any vehicle system 420, e.g., as expressed by OBDII information or the like. The subset 1314 can also include image information received from one or more external camera devices which capture a scene or scenes inside the vehicle 106 and/or outside the vehicle 106. For example, image information captured by an outward-pointing camera device can be used to reveal the presence of pedestrians and nearby vehicles, the presence of stop lights, and so on. The subset 1314 can also include audio information captured by one or more microphone devices.

This subset 1314 can also encompass any information that is extracted from a remote source (e.g., from any of the remote processing systems 118). Such information can include map information, traffic information, road condition information, hazard information, weather information, region population information, point of interest information, legal information regarding driving-related rules pertinent to a particular jurisdiction, and so on. Moreover, the map information can provide information regarding a region in any level of granularity. For example, the map information can identify the location of traffic lights, complex intersections, school zones, etc. in a region.

The information maintained by the remote processing systems 118 can be collected in various ways. In one approach, the remote processing systems 118 can collect the information based on in-field sensing devices, such as roadway camera devices, aerial and satellite camera devices, temperature sensing devices, precipitation-sensing devices, and so forth. In addition, or alternatively, the remote processing systems 118 can collect the information from human observers who manually report the information. In addition, or alternatively, the remote processing systems 118 can collect the information by crowd-sourcing it from a plurality of mobile devices provided in respective vehicles.

The above-identified forms of inference-input information are cited by way of illustration, not limitation; other implementations can provide other forms of inference-input information, and/or can omit one or more forms of inference-input information described above.

The state detection module 1308 infers the state of the vehicle 106 based on any combination of the forms of inference-input information enumerated above (and/or other forms of inference-input information). The state detection module 1308 can perform this task in different ways. In one implementation, the state detection module 1308 can maintain a lookup table which maps different permutations of input conditions (defined by the inference-input information) to corresponding vehicle state information. That is, the state detection module 1308 can indicate that, if input conditions L, M, N, and P are present, the vehicle state is in state X. In another case, the state detection module 1308 can use a statistical model to map a feature vector associated with a set of input conditions into an identified vehicle state. That statistical model can be produced in a machine-learning process. In another case, the state detection module 1308 can use a rules-based engine of any type or a neural network to map the input conditions into an identified vehicle state, and so on. These implementations are cited by way of example, not limitation. Section B will describe the illustrative behavior of the state detection module 1308 in greater detail, in the context of representative scenarios.

In addition, the state detection module 1308 can consult a route prediction module to determine the route that the user 102 is likely to take to reach a specified or predicted destination. The route information helps the state detection module 1308 operate in a more proactive manner by predicting difficult driving conditions that the user 102 is likely to confront as the trip progresses, before those conditions are actually encountered. The state detection module 1308 can also mine any other user resources in order to generate the vehicle state, such as calendar information, purchase history information, prior travel route information, and so on.

The experience presentation module 1310 receives information regarding the inferred vehicle state from the state detection module 1308. In response, the experience presentation module 1310 maps the vehicle state into a user interface experience. In general, as described above, the mode functionality 434 attempts to provide a user interface experience which consumes the attention of the user 102 in a way that is commensurate with the vehicle state. This means that that the user interface experience is such that it does not demand a level and type of attention from the user 102 that the user 102 cannot safely give in view of the vehicle state. This behavior, in turn, ultimately reduces the risk associated with the use of the mobile device 104 within the vehicle 106. At the same time, the mode functionality 434 provides a user experience that is not unduly restrictive, e.g., by unnecessarily precluding certain interactions that do not pose a significant risk to the user 102.

The experience presentation module 1310 can also consult functionality provided in the remote processing systems 118 (and its associated system store 122) to choose the user interface experience that it presents to the user 102. For example, the experience presentation module 1310 can determine the preferences and habits of the user 102, and then use this information to influence the selection of the user interface experience. The preferences may indicate the configurations of the user interface experience which the user prefers to receive in different driving circumstances. The experience presentation module 1310 may attempt to satisfy a preference of the user for a particular driving circumstance, providing that such a choice is not contradicted by other considerations. The habits can indicate the manner in which the user has driven the vehicle 106 (on past occasions) when confronted with various driving circumstances in conjunction with different user interface experiences. If the user performed poorly for a particular combination of a driving circumstance and a user interface experience, the experience presentation module 1310 can negatively weight this combination to disfavor its use on a future occasion.

In addition to providing a user interface experience, the experience presentation module 1310 can present warnings to the user. For example, a warning may alert the user to the fact that he or she is approaching a school zone. The warning may encourage the driver to be watchful for the presence of children. In addition, or alternatively, the warning may alert the user that he or she is driving too fast for the circumstances.

Figure 14:
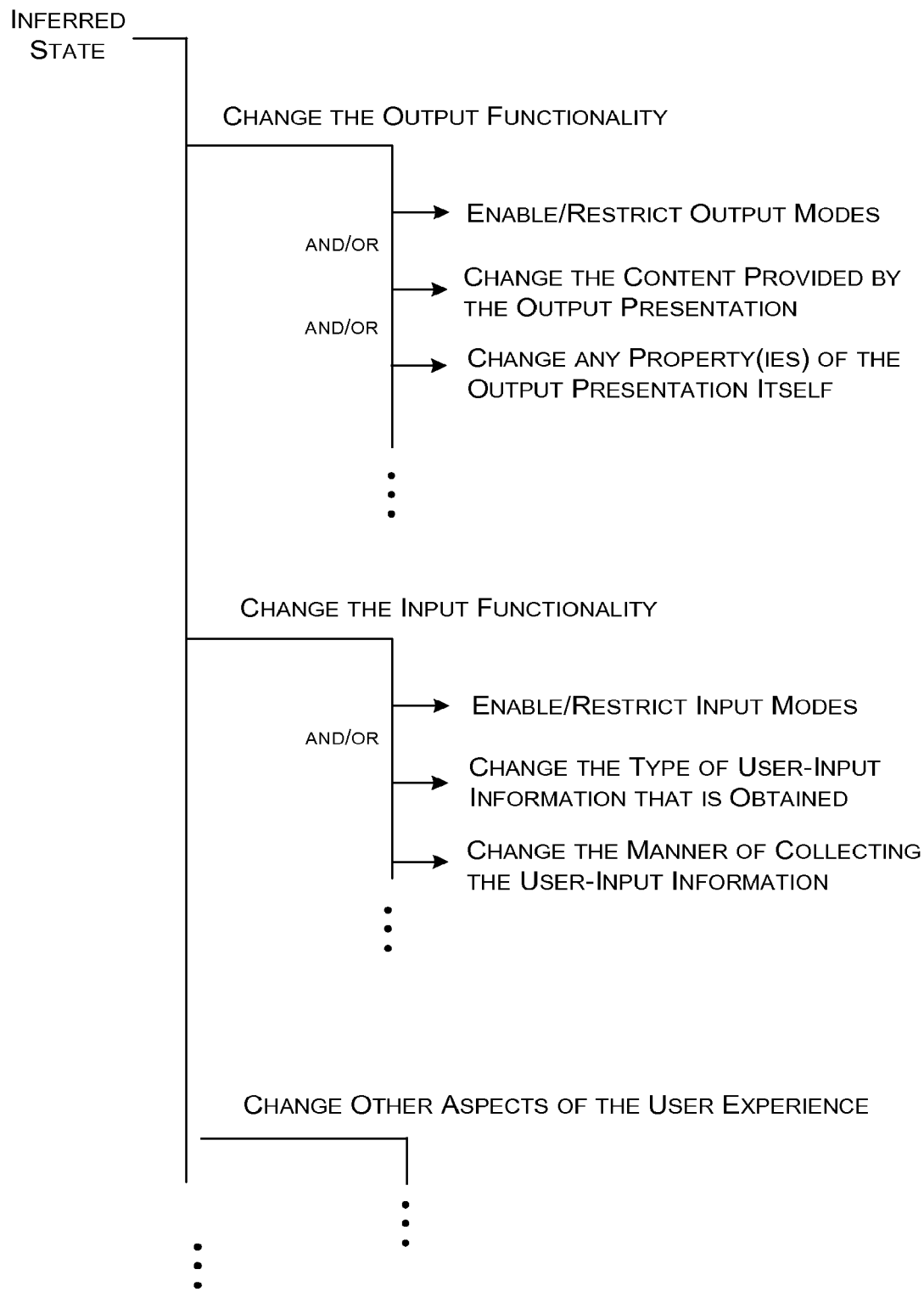
FIG. 14 enumerates illustrative options by which the mobile device of FIG. 4 can control a user interface experience, in response to the state of the vehicle.

FIG. 14 enumerates some of the different ways that the experience presentation module 1310 can produce a desired user interface experience. (Section B will describe yet more examples of the operation of the experience presentation module 1310.) As one general category, the experience presentation module 1310 can adjust some aspect of the output functionality 432. As another general category, the experience presentation module 1310 can adjust some aspect of the input functionality 410. The experience presentation module 1310 can also modify any other aspect of the environment 100 shown in FIG. 1.

First consider changes made to the output functionality 432. As a first change, the experience presentation module 1310 can enable or disable certain output modes in response to the vehicle state (or at least partially enable or restrict one or more parts of certain output modes). To cite one example, the experience presentation module 1310 can disable a display output mode when the vehicle 106 is moving. In lieu of that manner of output, the experience presentation module 1310 can provide output information via the speech output mode, or produce no output information at all so long as the moving condition prevails.

Alternatively, or in addition, the experience presentation module 1310 can change the content that it presents in response to the vehicle state. For example, as noted above, an application can include two or more collections of resources for use in providing an output presentation. The experience presentation module 1310 can present an output presentation using an appropriate collection of resources based on the vehicle state. For example, the experience presentation module 1310 can display large-sized icons when the speed of the vehicle 106 exceeds a prescribed threshold.

Alternatively, or in addition, the experience presentation module 1310 can change any property or properties of the output presentation itself in response to vehicle state. This type of change is similar to the one described immediately above. But here, instead of choosing an entirely new collection of resources, the experience presentation module 1310 can modify one or more variable attributes of the output presentation. This category encompasses a wide range of options. For example, for visual output presentations, the experience presentation module 1310 can adjust any of the size, contrast, color, transparency, etc. of the content that is displayed, the length of time that the content is displayed, the spatial organization between different parts of the content that is displayed, and so on. For audio output presentations, the experience presentation module 1310 can adjust the volume of the audio content that is presented, the rate of speaking provided by the audible content, and so on.

Alternatively, or in addition, the experience presentation module 1310 can send output information to different destinations based on the vehicle state. For example, for some vehicle states, the mobile device 104 may route the output information to an output device associated with the mobile device 104 itself. For other vehicle states, the mobile device 104 may route the output information to any vehicle system 420, such as a media system associated with the vehicle 106.

The experience presentation module 1310 can use yet other strategies for modifying any output presentation based on vehicle state.

Next consider the input functionality 410. As a first change, the experience presentation module 1310 can enable or disable certain input modes (or at least partially enable or restrict one or more parts of certain input modes). To cite one example, the experience presentation module 1310 can disable the touch screen input mode and the keypad input mode when the vehicle 106 is moving at a high speed. In lieu of that manner of input, the experience presentation module 1310 can provide input via the voice-recognition input mode and/or the gesture-recognition input mode.

Alternatively, or in addition, the experience presentation module 1310 can change the type of user-input information that is obtained based on vehicle state. For example, the experience presentation module 1310 can accept a fewer number of voice commands while the vehicle 106 is traveling at high speeds, compared to when the vehicle 106 is moving at slower speeds. This change can help reduces the complexity of the voice-recognition input mode at higher speeds, and hence the distraction that this mode may impose on the user 102.

Alternatively, or in addition, the experience presentation module 1310 can change the manner in which any input mode collects user-input information. For example, at certain junctures, an input mode may present a query to the user 102, requiring a response; after a certain amount of time without receiving an answer, the input mode can deactivate the query. At higher speeds, the input mode can extend the length of time for which it solicits a response from the user 102, as the user 102 may be distracted and unable to provide a quick answer.

The experience presentation module 1310 can use yet other strategies for modifying any input mode based on vehicle state.

Figure 15:
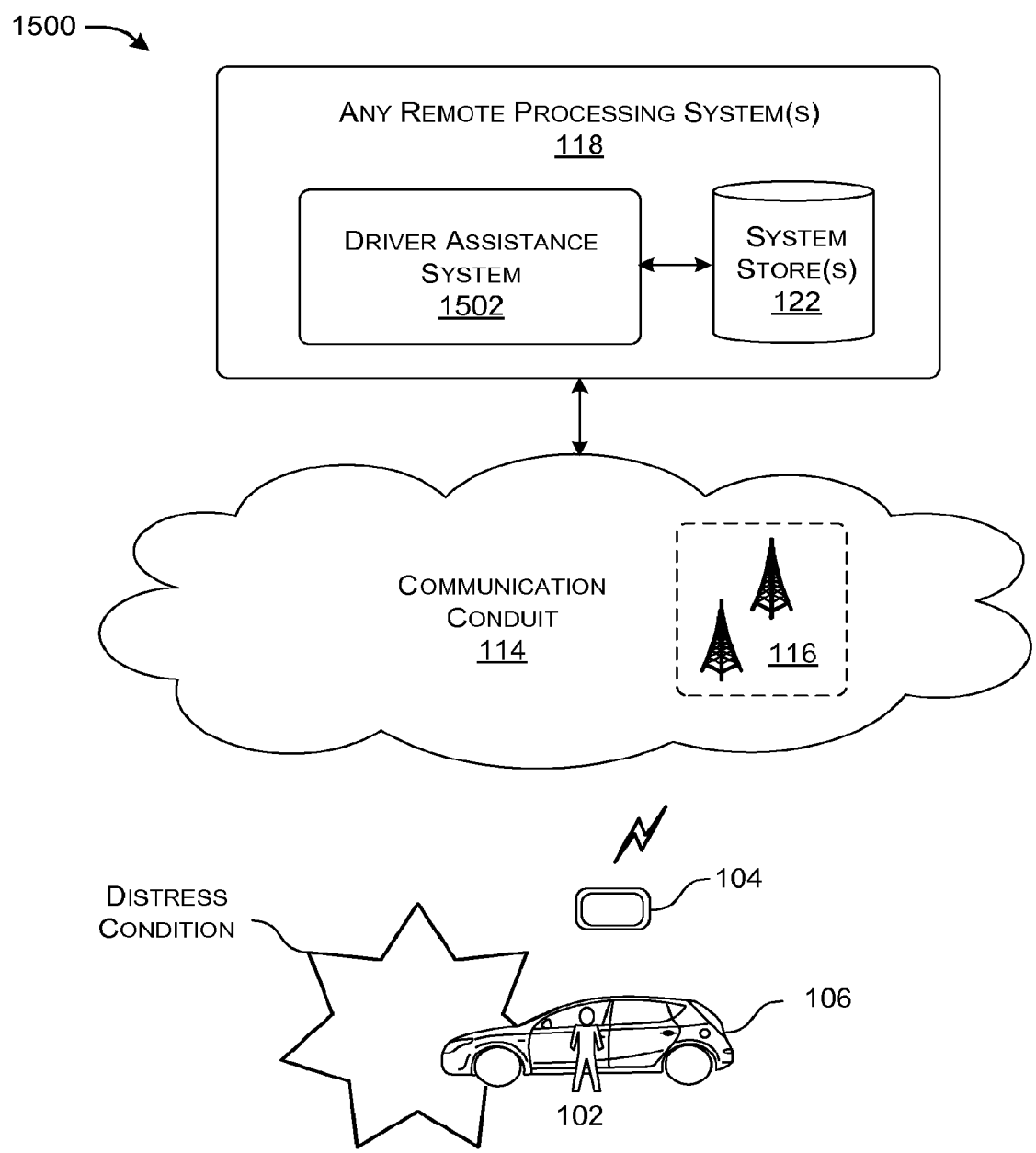
FIG. 15 shows an illustrative environment in which functionality can infer and respond to a distress condition that may affect the vehicle. For example, a distress condition may befall the vehicle when it is in an accident.

FIG. 15 shows another environment 1500 in which the user 102 can operate his or her mobile device 104 within the vehicle 106. In this context, the environment 1500 determines when the vehicle 106 appears to be in a distress condition. A distress condition corresponds to any traumatic event that befalls the vehicle 106, and by extension, the user 102 who is driving the vehicle 106. For example, a distress condition may correspond to an accident that has occurred that involves the vehicle 106. When a distress condition has occurred, the environment 1500 solicits help from a diver assistance system 1502. The driver assistance system 1502 can help the user 102 in various ways, such as by: (a) contacting the user 102 by telephone, text messaging, or other communication mechanism; (b) contacting an emergency response service (or services); (c) contacting the user's family members or other designated points of contact; (d) providing information regarding service stations and/or other assistance centers, and so on. Whenever the driver assistance system 1502 notifies a party of the occurrence of the distress condition, it can identify the location of the vehicle 106 and any qualifying circumstances surrounding the distress condition. The driver assistance system 1502 may be staffed by human agents who assist the user 102 in the event of a distress condition. In addition, or alternatively, the driver assistance system 1502 can include automated functionality for assisting the user 102.

Figure 16:
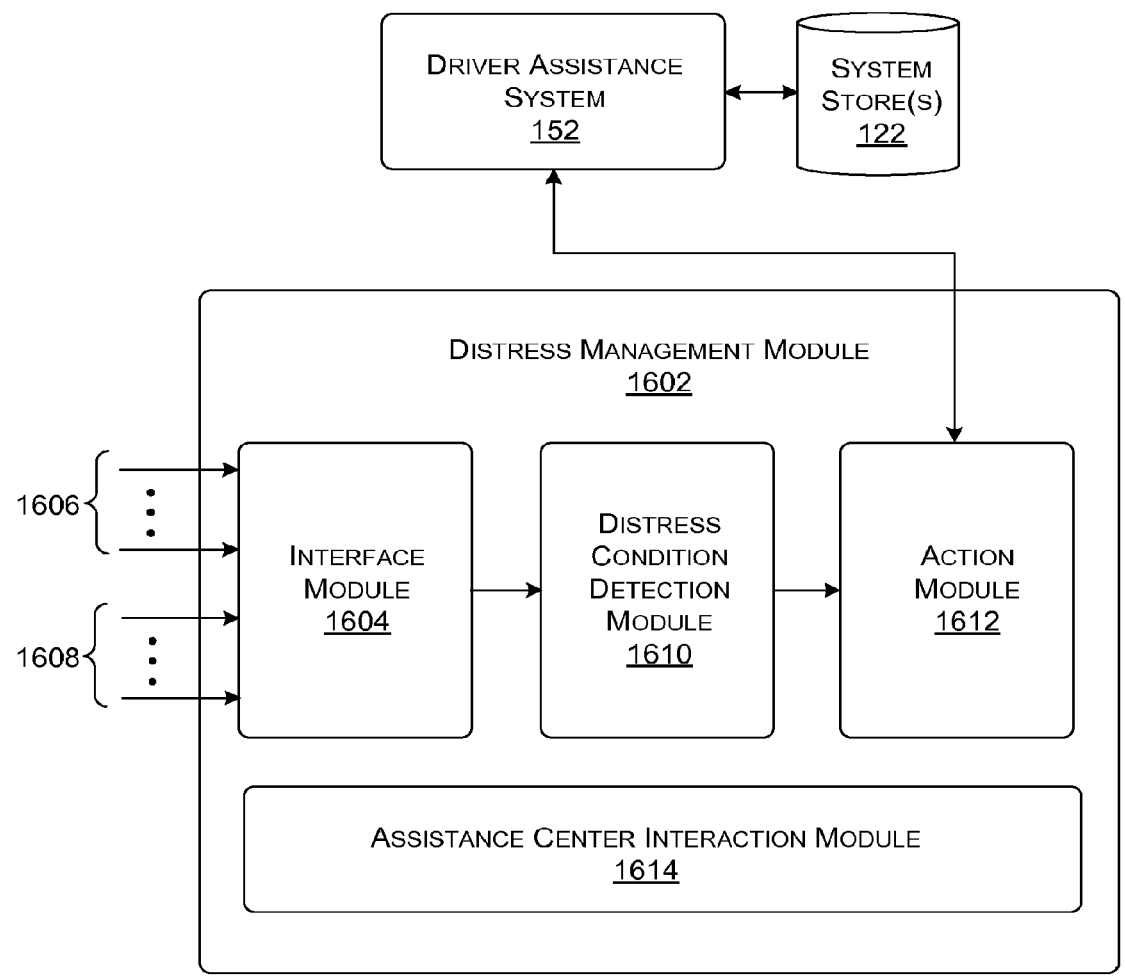
FIG. 16 shows an illustrative distress management module that can be used in the environment of FIG. 15.

FIG. 16 provides additional information regarding a distress management module 1602 that can detect and respond to a distress condition within the environment 1500 of FIG. 15. In one case, the mobile device 104 implements the distress management module 1602. Alternatively, or in addition, the remote processing systems 118 and/or mount 302 can implement at least part of the distress management module 1602.

The distress management module 1602 includes an interface module 1604 that receives a subset 1606 of instances of inference-input information from one or more internal input sources and/or a subset 1608 of instances of inference-input information from one or more external input sources. In other words, the interface module 1604 functions in the same manner as the interface module 1306 of FIG. 13.

A distress condition detection module 1610 analyzes the input information to determine whether a distress condition has occurred. Different environments can make this judgment in different ways. Generally, the distress condition detection module 1610 forms a signature from the various instances of inference-input information that have been received, and then determines whether this signature matches the telltale signature of a distress condition. In one case, the distress condition detection module 1610 determines that a distress condition has occurred if: (1) the mobile device 104 is present in the vehicle 106; and (2) the vehicle 106 came to an abrupt stop or otherwise abruptly decelerated (or accelerated); and/or (3) the mobile device 104 became dislodged from the mount 302 at about the same time as the occurrence of the abrupt deceleration (or acceleration). Informally, this means that an accident may have occurred which jolted the mobile device 104 out of its cradle 308. Or the mobile device 104 may otherwise experience a dramatic (e.g., a jarring) deceleration or acceleration without necessarily becoming dislodged from the cradle 308. A jolting deceleration may indicate that the moving vehicle 106 has collided with an object in its path. A jolting acceleration may indicate that the vehicle 106 has been hit by another moving object, including while the vehicle 106 is originally at rest.

The distress condition detection module 1610 can presume that the mobile device 104 is located in the vehicle 106 if, just prior to the abrupt deceleration, the attachment-sensing mechanism 316 indicates that the mobile device 104 is inserted in the cradle 308 of the mount 302. Likewise, the distress condition detection module 1610 can determine that the mobile device 104 has broken free of the mount 302 based on the output of the attachment-sensing mechanism 316. The distress condition detection module 1610 can determine that the mobile device 104 has come to an abrupt stop or otherwise abruptly decelerated (or accelerated) based on the output of the accelerometer device 502, for example.

In other cases, the distress condition detection module 1610 can indicate the occurrence of a distress condition without the occurrence of events (2) and/or (3). For example, the distress condition detection module 1610 take into consideration any of the following events in assessing the occurrence of a distress condition: (a) a dramatic application of the breaks; (b) erratic steering; (c) traversal of significantly uneven surfaces (as when the vehicle 106 veers off a roadway); (d) the vehicle 106 turning on its side or completely overturning, etc. In addition, or alternatively, the distress condition detection module 1610 can base its analysis on image information captured by one or more camera devices and/or audio information captured by one or more microphone devices. These events are cited by way of illustration, not limitation.

An action module 1612 can notify the driver assistance system 1502 when the distress condition detection module 1610 informs it that a distress condition has occurred. An assistance center interaction module 1614 allows the user 102 to subsequently communicate with the driver assistance system 1502 to receive manual and/or automated help from that entity.

As a closing point, the above-described explanation has set forth the use of the mode functionality 434 within vehicles. But the user 102 can use the mode functionality 434 to interact with the mobile device 104 in any environment. Generally stated, the mode functionality 434 provides a particularly useful service in those environments in which the user 102 may interact with the mobile device 104 in different use scenarios, and further where the user 102 has different respective capabilities of interacting with the mobile device 104 in these different scenarios. To cite merely one example, the mobile device 104 can determine whether the user 102 is interacting with the mobile device 104 while walking or running; if so, the mobile device 104 can present a user interface experience to the user 102 which takes into consideration various constraints to which the user 102 may be subject while walking or running (as opposed to interacting with the mobile device 104 while at a single location).

B. Illustrative Processes

FIGS. 17-22 show procedures that explain one manner of operation of the environment 100 of FIG. 1. Since the principles underlying the operation of the environment 100 have already been described in Section A, certain operations will be addressed in summary fashion in this section.

Figure 17:
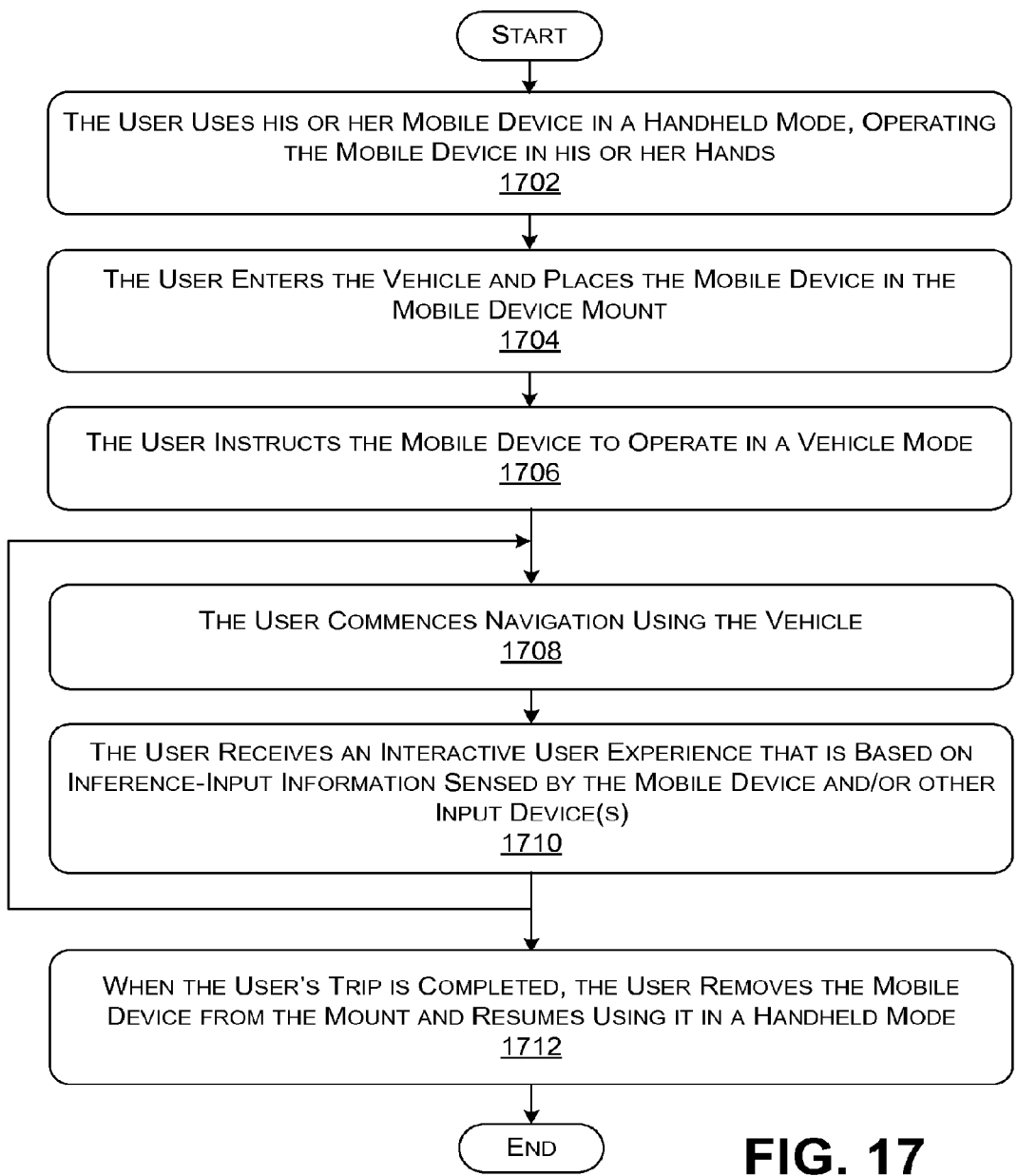
FIG. 17 shows an illustrative procedure that explains one manner of operation of the environment of FIG. 1, from the perspective of a user.

Starting with FIG. 17, this figure shows an illustrative procedure 1700 that sets forth one manner of operation of the environment 100 of FIG. 1, from the perspective of the user 102. In block 1702, the user 102 may use his or her mobile device 104 in a conventional mode of operation, e.g., by using his or her hands to interact with the mobile device 104 using the touch input device 424. In block 1704, the user 102 enters the vehicle 106 and places the mobile device 104 in any type of mount, such as the mount 302. In block 1706, the user 102 instructs the mobile device 104 to operate in the vehicle mode. In block 1708, the user 102 begins navigation using the vehicle 106. In block 1708, the user 102 receives a user interface experience that is tailored to a current vehicle state. The vehicle state, in turn, is based on input information supplied by various input sources. In block 1712, after completion of the user's trip, the user 102 may remove the mobile device 104 from the mount 302. The user 102 may then resume using the mobile device 104 in a normal handheld mode of operation.

Figure 18:
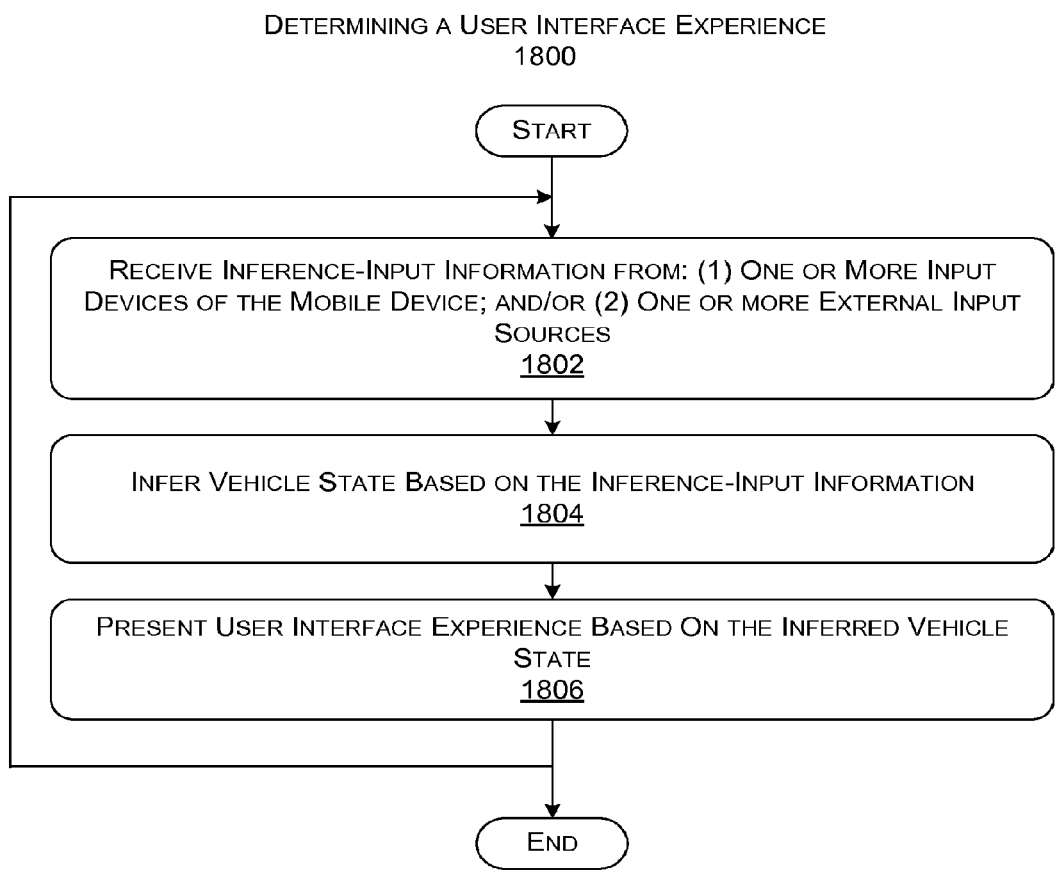
FIG. 18 shows an illustrative procedure by which a mobile device can provide a user interface experience based on an inferred state of a vehicle.

FIG. 18 shows an illustrative procedure 1800 which explains one manner of operation of the mode functionality 434, from the perspective of the mode functionality 434. In block 1802, the mode functionality 434 receives inference-input information from one or more input sources, including one or more internal input sources (e.g., corresponding to the movement-sensing devices 430), and/or one or more external input sources (e.g., corresponding to sensor information provided by a vehicle system 420). In block 1804, the mode functionality 434 infers the vehicle state based on the inference-input information. In block 1806, the mode functionality 434 presents a user interface experience based on the inferred driving state.

FIGS. 19-21 show three instantiations of the procedure 1700 of FIG. 17. For example, FIG. 19 presents a scenario that hinges on whether the vehicle 106 is moving or not. In block 1902, the mode functionality 434 receives inference-input information. In block 1904, the mode functionality 434 determines whether the vehicle 106 is moving or not. In block 1906, the mode functionality 434 can make any combination of the changes summarized in FIG. 8.

For example, in one scenario, the mode functionality 434 can use the inference-input information provided by any of the movement-sensing devices 430 and/or external sensor devices to determine that the vehicle 106 is in motion. In response, the mode functionality 434 can terminate the use of the display input mode, or use the display input mode to present simplified content (compared to the content it would present if the vehicle 106 was stationary). In lieu of the display input mode, the mode functionality 434 can optionally interact with the user 102 using the voice-recognition mode and/or the gesture-recognition input mode. Alternatively, the mode functionality 434 can preclude the presentation of certain types of content, such as video content, while the vehicle 106 is in motion.

FIG. 20 presents a scenario that depends on the manner in which the user 102 is driving the vehicle 106. In block 2002, the mode functionality 434 receives inference-input information. In block 2004, the mode functionality 434 classifies the manner in which the mobile device 104 is moving based on the inference-input information. In block 2006, the mode functionality 434 can make any combination of the changes summarized in FIG. 8.

For example, the mode functionality 434 can use any combination of inference-input information to compile a movement signature that characterizes the manner in which the device is moving. The mode functionality 434 can then compare this movement signature to telltale movement signatures associated with different classes of movement; a matching telltale signature indicates the type of movement that the vehicle 106 is currently undergoing. Such classes of movement can include (but are not limited to): (a) traveling at speeds over a prescribed threshold; (b) traveling at dramatically varying speeds; (c) traveling over a winding roadway; (d) traveling over a roadway with marked elevation changes; (e) traveling over an uneven surface; (f) making frequent lane changes while traveling; (g) frequently applying the breaks of the vehicle 106 while traveling; (h) frequently shifting gears while traveling (i) drifting over the roadway while traveling or traveling in an otherwise erratic manner, and so on. The mode functionality 434 can then apply a user interface experience which correlates to the matching telltale movement signature. As a general principle, if the collected evidence indicates that the task of driving is (or should be) an arduous or complex task at the current time, then the mode functionality 434 will seek to reduce the attention-related demands that it imposes on the user 102. Alternatively, or in addition, if the collected evidence indicates that the user 102 is already distracted (as evidenced by poor driving), then the mode functionality 434 will seek to lessen the attention-related burden on the user 102.

FIG. 21 presents a scenario that depends on an assessed location of the vehicle 106. In block 2102, the mode functionality 434 receives inference-input information. The inference-input information can include any evidence pertaining to the location of the vehicle 106. Such evidence can include position information, such as GPS information, WiFi or cell tower triangulation information, dead reckoning information, and so on. In addition, or alternatively, the mode functionality 434 can directly monitor the environment in which the user 102 is traveling based on image information captured by one or more camera devices and/or audio information captured by one or more microphone devices.

In block 2104, the mode functionality 434 identifies the region in which the vehicle 106 is located based on the inference-input information. This can comprise position-related analysis of position information received by any position-determining device. For example, this operation may involve determining a street location of the vehicle 106 by consulting map information that is provided by the mobile device 104 and/or the remote processing systems 118. The determination of the region can also involve analysis of image information received from camera devices and/or analysis of audio information received from microphone devices. For example, the mode functionality 434 can rely on image analysis to determine that the roadway on which the user 102 is traveling is congested with pedestrians and/or other vehicles.

As another part of this block 2104, the mode functionality 434 can ascertain the driving-related implications of the region in which the vehicle 106 is located. In one implementation, the mode functionality 434 can make this assessment by consulting the remote processing systems 118 (and the associated system store 122). The remote processing systems 118 can determine whether there are any attention-related considerations that have a bearing on the amount and type of attention that a user 102 is expected to maintain while in the identified region. Based on this information, in block 2106, the mode functionality 434 can make any combination of the changes summarized in FIG. 8.

For example, the mode functionality 434 can ascertain whether the user 102 is within any one or the following representative regions to which a particular attention profile may apply: (a) a school zone; (b) a construction zone; (c) an area in proximity to emergency services; (d) a hazard zone, and so on. More generally, the mode functionality can also use any position-related evidence to determine the driving rules which are applicable to the vehicle 106 at a particular point in time. The mode functionality 434 can then apply a user interface experience which it appropriate for the identified region.

Alternatively, the mode functionality 434 can make its determination of the vehicle state based on the manner in which the user 102 is driving his or her vehicle 106 (as ascertained in scenario A or scenario B), combined with insight regard the present location of the vehicle 106 (as ascertained in scenario C). For example, the mode functionality 434 can selectively disable a display input mode output presentation when the user 102 is driving more than 20 MPH on a street that borders a park.

Figure 22:
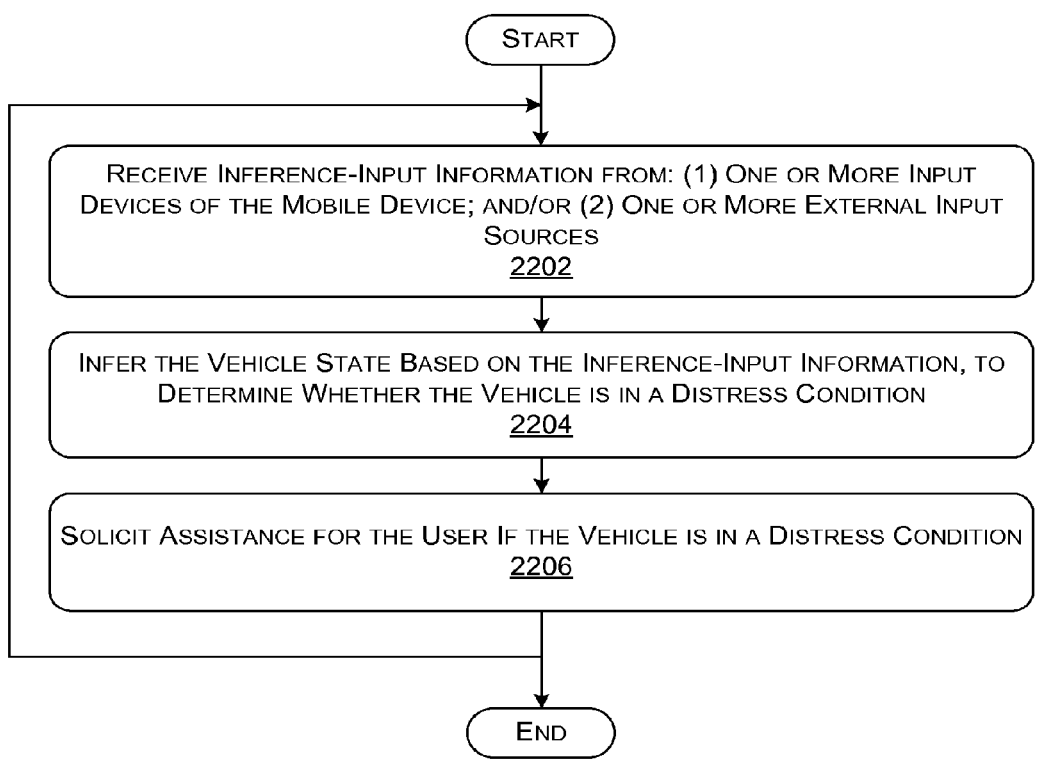
FIG. 22 shows an illustrative procedure by which the distress management module of FIG. 16 can infer and respond to a distress condition that may affect the vehicle.

FIG. 22 shows a procedure 2200 which summarizes one manner of operation of the distress management module 1602 shown in FIG. 16. In block 2202, the distress management module 1602 receives inference-input information. In block 2204, the distress management module 1602 determines whether the vehicle 106 is in a distress condition at the present time, based on the inference-input information. In block 2206, the distress management module 1602 presents assistance to the user 102 (presuming that the vehicle 106 is in a distress condition). This assistance can include contacting the remote driver assistance system 1502.

C. Representative Computing functionality

FIG. 23 sets forth illustrative computing functionality 2300 that can be used to implement any aspect of the functions described above. For example, the computing functionality 2300 can be used to implement any aspect of the mobile device 104. In addition, the type of computing functionality 2300 shown in FIG. 23 can be used to implement any aspect of the remote processing systems 118. In one case, the computing functionality 2300 may correspond to any type of computing device that includes one or more processing devices. In all cases, the computing functionality 2300 represents one or more physical and tangible processing mechanisms.

The computing functionality 2300 can include volatile and non-volatile memory, such as RAM 2302 and ROM 2304, as well as one or more processing devices 2306 (e.g., one or more CPUs, and/or one or more GPUs, etc.). The computing functionality 2300 also optionally includes various media devices 2308, such as a hard disk module, an optical disk module, and so forth. The computing functionality 2300 can perform various operations identified above when the processing device(s) 2306 executes instructions that are maintained by memory (e.g., RAM 2302, ROM 2304, or elsewhere).

More generally, instructions and other information can be stored on any computer readable medium 2310, including, but not limited to, static memory storage devices, magnetic storage devices, optical storage devices, and so on. The term computer readable medium also encompasses plural storage devices. In all cases, the computer readable medium 2310 represents some form of physical and tangible entity.

The computing functionality 2300 also includes an input/output module 2312 for receiving various inputs (via input modules 2314), and for providing various outputs (via output modules). One particular output mechanism may include a presentation module 2316 and an associated graphical user interface (GUI) 2318. The computing functionality 2300 can also include one or more network interfaces 2320 for exchanging data with other devices via one or more communication conduits 2322. One or more communication buses 2324 communicatively couple the above-described components together.

The communication conduit(s) 2322 can be implemented in any manner, e.g., by a local area network, a wide area network (e.g., the Internet), etc., or any combination thereof. The communication conduit(s) 2322 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    determining that a mobile device is in a vehicle based upon at least one of mobile device-provided input information provided by the mobile device or vehicle-provided input information provided by the vehicle;
    automatically switching the mobile device from a handheld mode to a vehicle mode based upon the at least one of the mobile device-provided input information or the vehicle-provided input information;
    evaluating the at least one of the mobile device-provided input information or the vehicle-provided input information to select a current vehicle state of the vehicle having a corresponding level of driving complexity, the current vehicle state being selected from a plurality of predetermined vehicle states associated with different levels of driving complexity; and,
    generating a user interface experience for a user who is operating the vehicle based at least in part on the corresponding level of driving complexity of the current vehicle state, wherein the user interface experience imposes attention-related demands on the user and wherein the user interface experience replaces at least some input commands with other input commands that are associated with the corresponding level of driving complexity of the current vehicle state.

2. The method of claim 1, further comprising:
    obtaining the mobile device-provided input information from one or more of:
    an accelerometer device of the mobile device;
    a gyro device of the mobile device;
    a vision device of the mobile device;
    a magnetometer device of the mobile device;
    or a position-determining device of the mobile device,
    wherein the mobile device-provided input information is evaluated to select the current vehicle state.

3. The method of claim 2, wherein the mobile device-provided input information is obtained from the position-determining device and the position-determining device comprises a GPS device.

4. The method of claim 1, further comprising:
    obtaining the vehicle-provided input information, wherein the vehicle- provided input information indicates whether passengers are present in the vehicle and the vehicle-provided input information is evaluated to select the current vehicle state.

5. The method of claim 1, further comprising: obtaining and evaluating both the vehicle-provided input information and the mobile device-provided input information to select the current vehicle state.

6. The method of claim 1, wherein the evaluating comprises:
    compiling a movement signature from the at least one of the mobile device-provided input information or the vehicle-provided input information.

7. The method of claim 6, wherein the evaluating comprises comparing the movement signature to a plurality of different movement signatures associated with different classes of movement to determine the current vehicle state.

8. The method of claim 7, wherein the different classes of movement correspond to different variations in speed of the vehicle and the current vehicle state characterizes an extent to which the speed of the vehicle varies.

9. The method of claim 7, wherein the different classes of movement correspond to different amounts of braking of the vehicle and the current vehicle state characterizes an extent to which the brakes of the vehicle are being applied.

10. The method of claim 1, wherein, in the vehicle mode, the generating comprises sending the generated user interface experience to the vehicle for presentation by the vehicle.

11. The method of claim 1, wherein the at least some input commands that are replaced are touch input commands and the other input commands are voice-based or gesture-based commands.

12. The method of claim 1, wherein the generating comprises presenting the user interface experience on the mobile device.

13. A mobile device, comprising:
    a display;
    a processor; and a computer-readable medium storing computer readable instructions which, when executed by the processor, cause the processor to:

allow a user to specify that the mobile device operate in either a handheld mode or a vehicle mode; in the vehicle mode:
  obtain sensor information from one or more sensors, and
  use the sensor information to predict a route that a vehicle is likely to take to reach a specified or predicted destination; based at least on the predicted route, determine a predicted future vehicle state of the vehicle, the predicted future vehicle state having an attention profile that characterizes a level of attention and a type of attention which is appropriate for the user to maintain while operating the vehicle; and
  configure a user interface of the mobile device to comply with the attention profile for the predicted future vehicle state.

14. The mobile device of claim 13, wherein:
an application with which the mobile device interacts includes a plurality of resources, the plurality of resources including at least a first group of resources adapted for application in a first vehicle state, and a second group of resources adapted for application in a second vehicle state, and
the computer readable instructions, when executed by the processor, cause the processor to use either the first group of resources or the second group of resources based at least on the predicted future vehicle state.

15. The mobile device of claim 13, further comprising the one or more sensors.

16. The mobile device of claim 15, wherein:
the one or more sensors indicate a location of the mobile device, and
the computer readable instructions, when executed by the processor, cause the processor to consult prior routes traveled by the mobile device to predict the route.

17. The mobile device of claim 13, wherein the computer readable instructions, when executed by the processor, cause the processor to:
determine predicted driving conditions associated with the predicted route; and
determine the predicted future vehicle state based at least on the predicted driving conditions.

18. The mobile device of claim 13, wherein:
the one or more sensors are provided by the vehicle, and
the computer readable instructions, when executed by the processor,
cause the processor to obtain the sensor information from the vehicle.

19. A method comprising:
operating a mobile device having a handheld mode and a vehicle mode in the vehicle mode;
while in the vehicle mode:
  obtaining sensor information from one or more sensors, and
  using the sensor information to predict a route that a vehicle is likely to take to reach a specified or predicted destination;
  based at least on the predicted route, determining a predicted future vehicle state of the vehicle, the predicted future vehicle state having an attention profile that characterizes a level of attention and a type of attention which is appropriate for a user to maintain while operating the vehicle; and
  configuring a user interface of the mobile device in accordance with the attention profile for the predicted future vehicle state.

20. The method of claim 19, performed entirely by the mobile device.

* * * * *